US012665772B2

(12) United States Patent
Hunt et al.

(10) Patent No.: US 12,665,772 B2
(45) Date of Patent: Jun. 23, 2026

(54) AUTHENTICATION RESPONSE VERIFICATION USING QUBITS AND QUANTUM CHANNEL

(71) Applicant: TELEFONAKTIEBOLAGET LM ERICSSON (PUBL), Stockholm (SE)

(72) Inventors: Alexander Hunt, Tygelsjö (SE); Håkan Englund, Lund (SE); Per Ståhl, Klagshamn (SE); Andreas Kristensson, Södra Sandby (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 192 days.

(21) Appl. No.: 17/797,335

(22) PCT Filed: Feb. 3, 2020

(86) PCT No.: PCT/EP2020/052612
§ 371 (c)(1),
(2) Date: Aug. 3, 2022

(87) PCT Pub. No.: WO2021/155903
PCT Pub. Date: Aug. 12, 2021

(65) Prior Publication Data
US 2023/0058053 A1     Feb. 23, 2023

(51) Int. Cl.
*H04L 9/32*          (2006.01)
*H04L 9/08*          (2006.01)

(52) U.S. Cl.
CPC .......... *H04L 9/3271* (2013.01); *H04L 9/0852* (2013.01); *H04L 9/3215* (2013.01); *H04L 9/3247* (2013.01)

(58) Field of Classification Search
CPC ... H04L 9/0852; H04L 9/3215; H04L 9/3247; H04L 9/3271

(Continued)

(56) References Cited

U.S. PATENT DOCUMENTS

2003/0159036 A1* 8/2003 Walmsley .............. G06Q 20/40
                                                713/168
2012/0195597 A1* 8/2012 Malaney ............... H04W 12/10
                                                398/115
(Continued)

FOREIGN PATENT DOCUMENTS

CN        102904726 A     1/2013
CN        106411521 A     2/2017
(Continued)

OTHER PUBLICATIONS

Zou, X., et al., "The scheme of a quantum communication network's construction," Journal of Jiangxi Normal University (Natural Science Edition), vol. 37, No. 5, Sep. 2013, English abstract, 5 pages.

(Continued)

*Primary Examiner* — David P Zarka

(74) *Attorney, Agent, or Firm* — Rothwell, Figg, Ernst & Manbeck, P.C.

(57)          ABSTRACT

A method (100) for performing an authentication procedure between a verifying device and a responding device is disclosed, the verifying and responding devices being provisioned with security credentials. The method, performed by the verifying device, comprises generating an authentication challenge (110), delivering the authentication challenge to the responding device (120), receiving an authentication response from the responding device (130), and verifying the authentication response (140). According to the method, at least one of the authentication challenge or authentication response is encoded as a sequence of qubits and delivered over a quantum communication channel between the verifying device and the responding device (120A, 120B, 130A, 130B). Also disclosed are methods for delivering and receiving a message over a quantum com- (Continued)

munication channel, and devices for performing authentication and message exchange methods.

31 Claims, 23 Drawing Sheets

(58) Field of Classification Search
USPC ......................................................... 713/168
See application file for complete search history.

(56) References Cited

U.S. PATENT DOCUMENTS

| | | | | |
|---|---|---|---|---|
| 2013/0051800 A1* | 2/2013 | Soto Rodriguez .... | H04L 9/0852 |
| | | | | 398/65 |
| 2016/0359623 A1* | 12/2016 | Unruh ................... | H04L 9/3271 |
| 2017/0346627 A1* | 11/2017 | Alleaume ............. | H04L 9/0858 |
| 2019/0159023 A1* | 5/2019 | Wang .................... | H04L 63/062 |
| 2019/0251234 A1* | 8/2019 | Liu ...................... | G06Q 20/385 |
| 2019/0293776 A1* | 9/2019 | Yokoi ..................... | G01S 13/86 |
| 2020/0044888 A1* | 2/2020 | Manricks ............ | H04L 12/2838 |
| 2020/0358536 A1* | 11/2020 | Griffin ................... | H04B 10/70 |
| 2020/0358619 A1* | 11/2020 | Ding .................... | H04L 9/3242 |
| 2022/0116208 A1* | 4/2022 | Stapleton .............. | H04L 9/0631 |
| 2023/0275752 A1* | 8/2023 | Woodward ........... | H04L 9/0852 |
| | | | | 713/168 |

FOREIGN PATENT DOCUMENTS

| | | | |
|---|---|---|---|
| CN | 107993315 A | 5/2018 |
| EP | 2693685 A1 | 2/2014 |
| WO | 2015022047 A1 | 2/2015 |
| WO | 2015118179 A1 | 8/2015 |

OTHER PUBLICATIONS

ETSI GR QSC 001 V1.1.1 (Jul. 2016), 42 pages.

* cited by examiner

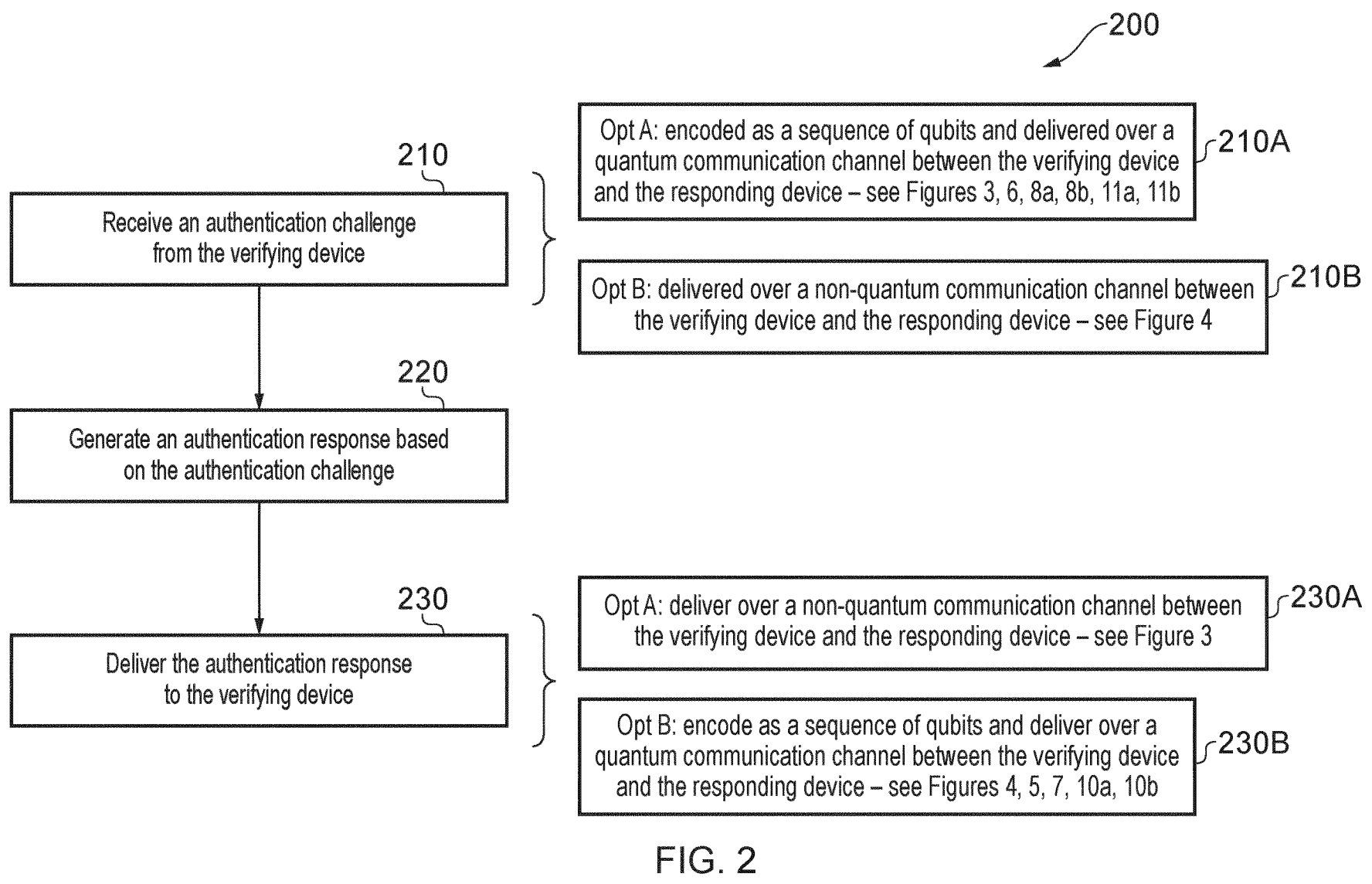

200

210

Receive an authentication challenge from the verifying device

210A

Opt A: encoded as a sequence of qubits and delivered over a quantum communication channel between the verifying device and the responding device – see Figures 3, 6, 8a, 8b, 11a, 11b

210B

Opt B: delivered over a non-quantum communication channel between the verifying device and the responding device – see Figure 4

220

Generate an authentication response based on the authentication challenge

230

Deliver the authentication response to the verifying device

230A

Opt A: deliver over a non-quantum communication channel between the verifying device and the responding device – see Figure 3

230B

Opt B: encode as a sequence of qubits and deliver over a quantum communication channel between the verifying device and the responding device – see Figures 4, 5, 7, 10a, 10b

FIG. 2

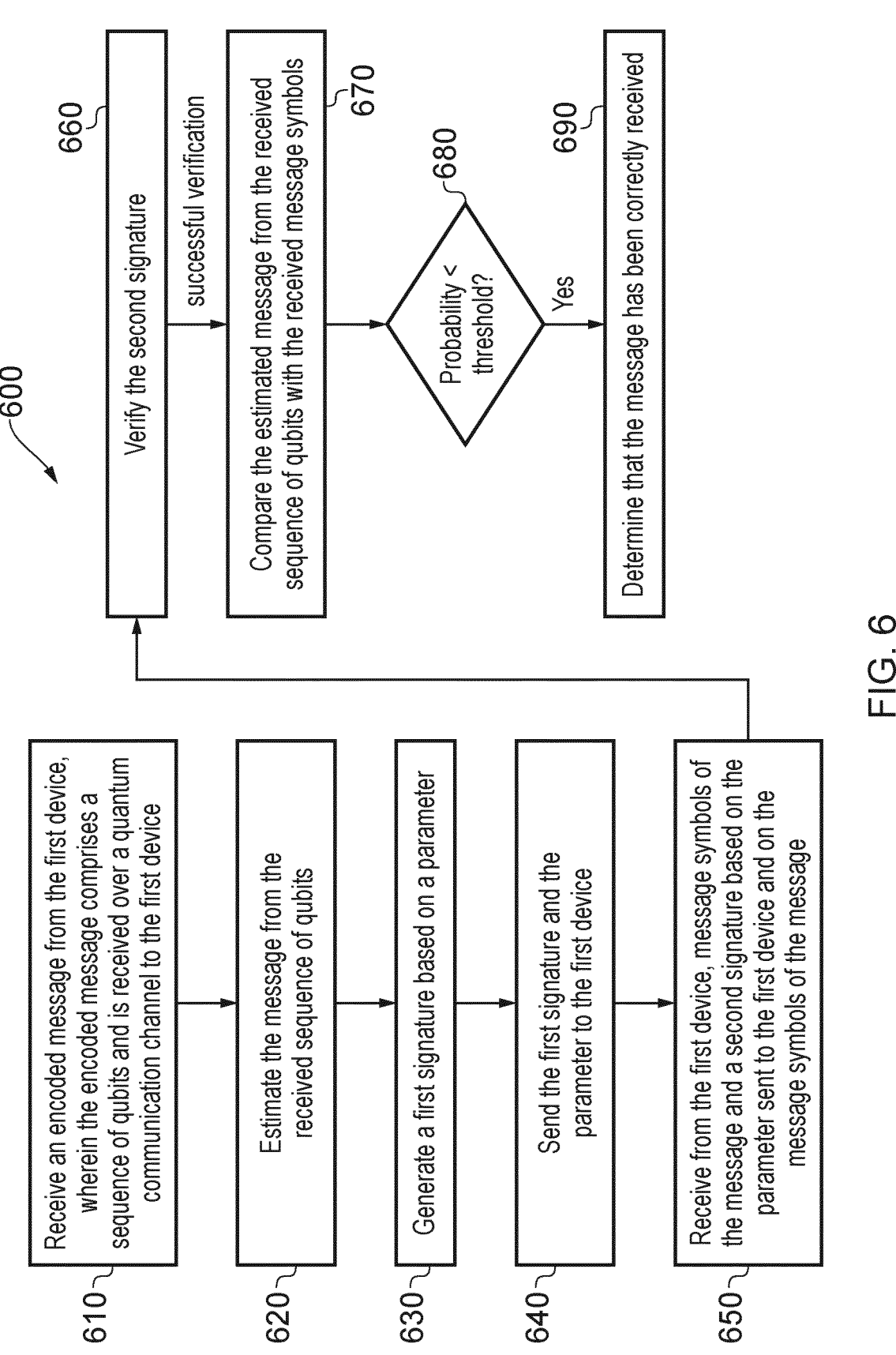

600

610 — Receive an encoded message from the first device, wherein the encoded message comprises a sequence of qubits and is received over a quantum communication channel to the first device 620 — Estimate the message from the received sequence of qubits 630 — Generate a first signature based on a parameter 640 — Send the first signature and the parameter to the first device 650 — Receive from the first device, message symbols of the message and a second signature based on the parameter sent to the first device and on the message symbols of the message 660 — Verify the second signature successful verification 670 — Compare the estimated message from the received sequence of qubits with the received message symbols 680 — Probability < threshold?

Yes

690 — Determine that the message has been correctly received

FIG. 6

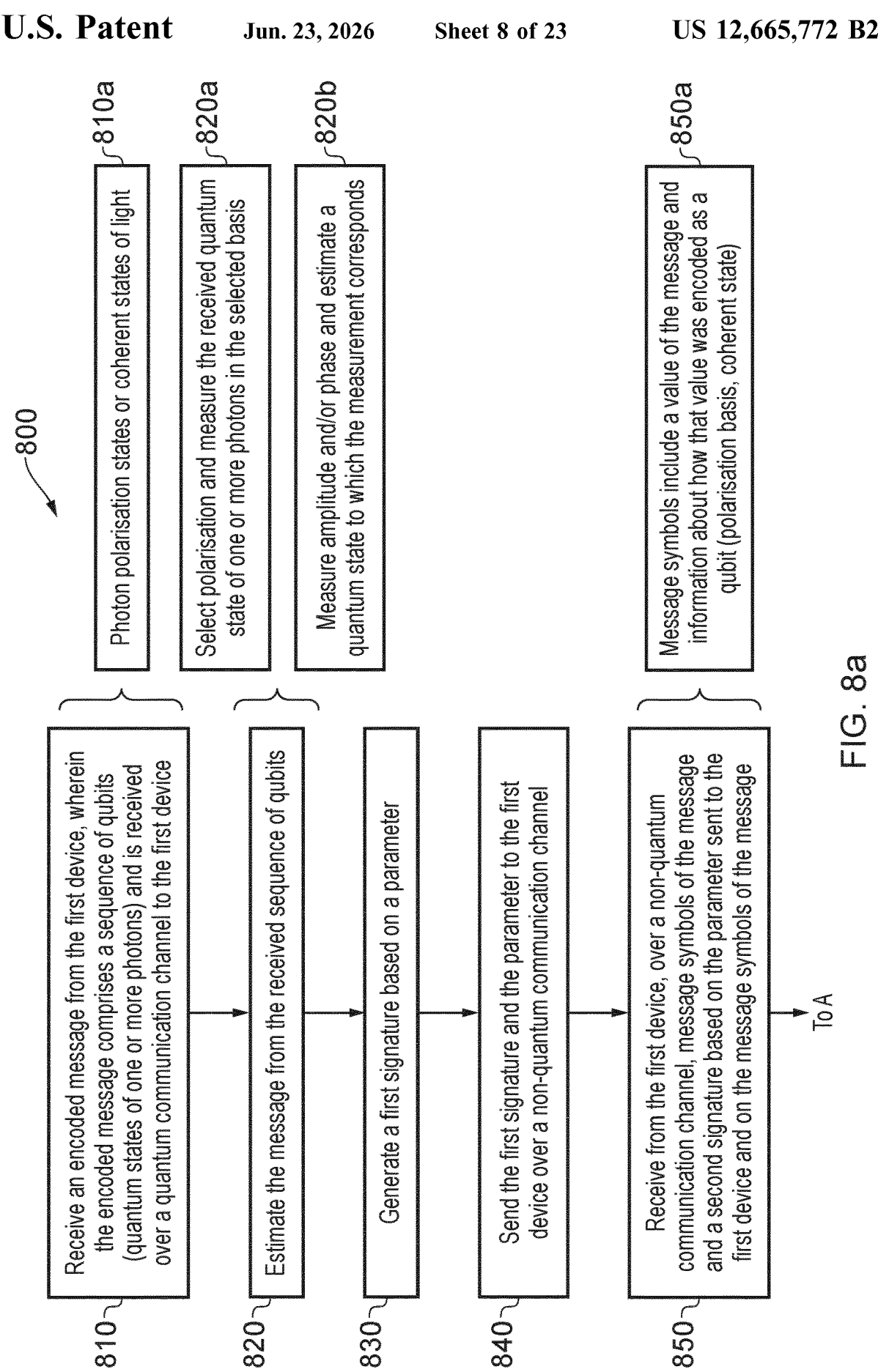

800

810 — Receive an encoded message from the first device, wherein the encoded message comprises a sequence of qubits (quantum states of one or more photons) and is received over a quantum communication channel to the first device 810a — Photon polarisation states or coherent states of light 820 — Estimate the message from the received sequence of qubits 820a — Select polarisation and measure the received quantum state of one or more photons in the selected basis 820b — Measure amplitude and/or phase and estimate a quantum state to which the measurement corresponds 830 — Generate a first signature based on a parameter 840 — Send the first signature and the parameter to the first device over a non-quantum communication channel 850 — Receive from the first device, over a non-quantum communication channel, message symbols of the message and a second signature based on the parameter sent to the first device and on the message symbols of the message 850a — Message symbols include a value of the message and information about how that value was encoded as a qubit (polarisation basis, coherent state)

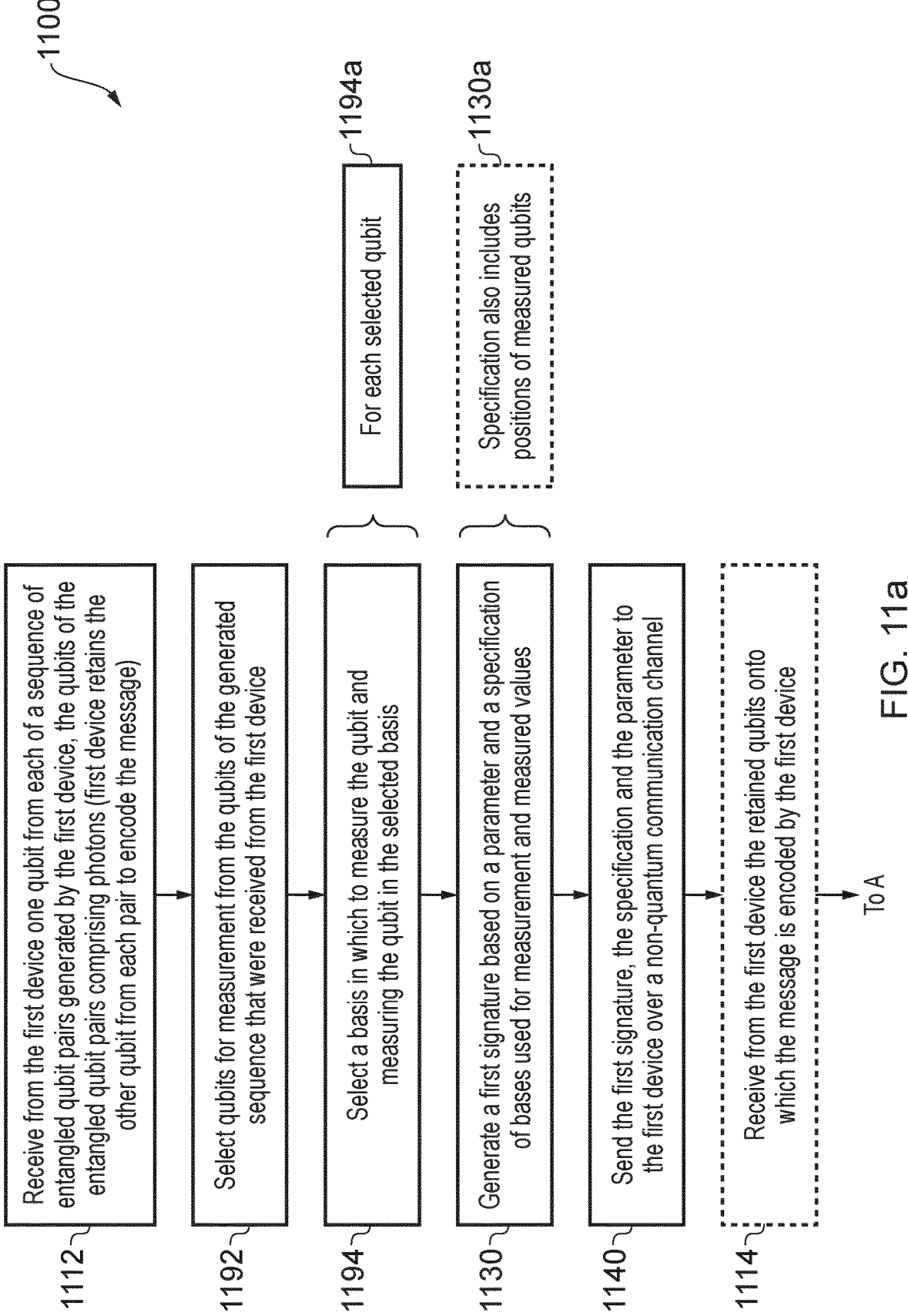

1100

1112 — Receive from the first device one qubit from each of a sequence of entangled qubit pairs generated by the first device, the qubits of the entangled qubit pairs comprising photons (first device retains the other qubit from each pair to encode the message)

1192 — Select qubits for measurement from the qubits of the generated sequence that were received from the first device 1194 — Select a basis in which to measure the qubit and measuring the qubit in the selected basis 1194a — For each selected qubit 1130 — Generate a first signature based on a parameter and a specification of bases used for measurement and measured values 1130a — Specification also includes positions of measured qubits 1140 — Send the first signature, the specification and the parameter to the first device over a non-quantum communication channel 1114 — Receive from the first device the retained qubits onto which the message is encoded by the first device To A

2110    First Device 2102    2104

Processor    Memory

Computer
Program

Interfaces 2106    2150

2200

2210    Second Device 2202    2204

Processor    Memory

Computer
Program

Interfaces 2206    2250

AUTHENTICATION RESPONSE VERIFICATION USING QUBITS AND QUANTUM CHANNEL

PRIORITY CLAIM

This application is a national stage of International Patent Application No. PCT/EP2020/052612, filed Feb. 3, 2020, the disclosure of which is hereby incorporated in in its entirety by reference.

TECHNICAL FIELD

The present disclosure relates to a method and devices for performing an authentication procedure. The present disclosure relates to a method and devices for delivering and receiving a message. The present disclosure also relates to a computer program and a computer program product configured, when run on a computer to carry out methods for performing an authentication procedure and for delivering and receiving a message.

BACKGROUND

Authentication procedures are used in a wide variety of applications and across many different industries. Authentication procedures typically involve a challenge sent by a first, verifying party to a second, responding party. The responding party generates a response based on the challenge and returns the response to the verifying party, which then verifies the response.

One example use case for authentication procedures is in so called "keyless" systems for cars or other vehicles. According to such systems, the car and its associated key communicate over radio, so that when the car key comes into close proximity with the car, the car is automatically opened upon successful authentication of the car key, without the key holder having to press any button on the key. In an example keyless system, the car, acting as the verifier, sends out an authentication request containing a challenge. The car key, acting as the responder, calculates an authentication response based on the challenge and a secret credential stored in the car key. The authentication response is sent by the car key to the car, which then, upon successful verification of the authentication response, unlocks the car.

Such keyless systems may also be used for allowing vehicle access to restricted areas, and in other access or control based use cases.

Keyless systems have been shown to be vulnerable to so called relay attacks, several of which have been reported in recent years in relation to car theft and break-in. In a relay attack, an attacker relays the authentication request from the verifying entity (i.e. the car) towards a responder (i.e. the car key) and the subsequent authentication response from the responder to the verifier. The responder is assumed by the verifier to be in close proximity but in fact, owing to the relaying of the challenge and response messages, may be a long distance from the verifier. In this manner, for example, signals may be relayed between a car parked in a public garage and its associated key which is in the possession of the car owner who is located a significant distance away from the garage, resulting in the unlocking of the car even though the car owner is not adjacent to the car.

While described in the context of keyless systems for cars, the issue of relay attacks in authentication procedures is not limited to this particular use case, and is a hindrance to the development of such systems for other use cases. In addition, the undetected relaying of messages other than authentication procedure messages may also be problematic in various use cases and application scenarios.

Detecting and foiling relay attacks in keyless authentication systems depends upon overcoming the inherent difficulty of measuring proximity of communicating entities using radio waves. One potential solution to this problem is the use of distance bounding protocols, which set a maximum time within which an authentication response must be received in order to be considered as valid. The maximum time is set on the basis of a maximum allowed distance between the communicating entities and the speed of light. While offering a means to ensure proximity of communicating entities, distance bounding protocols suffer from problems with processing delays, and do not therefore offer a viable commercial solution to the threat of relay attacks.

SUMMARY

It is an aim of the present disclosure to provide methods, devices and a computer readable medium which at least partially address one or more of the challenges discussed above. It is a further aim of the present disclosure to provide methods, devices and a computer readable medium which cooperate to ensure that an attempted relay attack on an authentication procedure or message exchange process may be detected and prevented from succeeding.

According to a first aspect of the present disclosure, there is provided a method for performing an authentication procedure between a verifying device and a responding device, wherein the verifying and responding devices are provisioned with security credentials. The method, performed by the verifying device, comprises generating an authentication challenge and delivering the authentication challenge to the responding device. The method further comprises receiving an authentication response from the responding device and verifying the authentication response. According to the method, at least one of the authentication challenge or authentication response is encoded as a sequence of qubits and delivered over a quantum communication channel between the verifying device and the responding device.

According to another aspect of the present disclosure, there is provided a method for performing an authentication procedure between a verifying device and a responding device, wherein the verifying and responding devices are provisioned with security credentials. The method, performed by the responding device, comprises receiving an authentication challenge from the verifying device and generating an authentication response based on the authentication challenge. The method further comprises delivering the authentication response to the verifying device. According to the method, at least one of the authentication challenge or authentication response is encoded as a sequence of qubits and delivered over a quantum communication channel between the verifying device and the responding device.

According to another aspect of the present disclosure, there is provided a method, performed by a first device, for delivering a message to a second device, wherein the first and second devices are provisioned with security credentials. The method comprises encoding the message as a sequence of qubits and delivering the encoded message over a quantum communication channel to the second device. The method further comprises receiving a parameter and a first signature, which is based on the parameter, from the second device, and verifying the first signature. The method further comprises, if the verification of the first signature is successful, generating a second signature based on the received parameter and on message symbols of the message, and sending the message symbols and the second signature to the second device.

According to another aspect of the present disclosure, there is provided a method for receiving a message from a first device, wherein the method is performed by a second device, and wherein the first and second devices are provisioned with security credentials. The method comprises receiving an encoded message from the first device, wherein the encoded message comprises a sequence of qubits and is received over a quantum communication channel to the first device. The method further comprises estimating the message from the received sequence of qubits, generating a first signature based on a parameter, and sending the first signature and the parameter to the first device. The method further comprises receiving, from the first device, message symbols of the message and a second signature based on the parameter sent to the first device and on the message symbols of the message.

The method further comprises verifying the second signature, and, if the verification of the second signature is successful, comparing the estimated message from the received sequence of qubits with the received message symbols, and, if a probability of error between the estimated message and the received message symbols is below a threshold value, determining that the message has been correctly received.

According to another aspect of the present disclosure, there is provided a computer program and a computer program product configured, when run on a computer to carry out methods for performing an authentication procedure, and/or for delivering and receiving a message, as set out above.

According to another aspect of the present disclosure, there is provided a verifying device, a responding device, a first device and a second device, the devices comprising processing circuitry configured to carry out methods for performing an authentication procedure, and/or for delivering and receiving a message, as set out above.

BRIEF DESCRIPTION OF THE DRAWINGS

For a better understanding of the present disclosure, and to show more clearly how it may be carried into effect, reference will now be made, by way of example, to the following drawings in which:

FIG. 2 is a flow chart illustrating process steps in a method, performed by a responding device, for performing an authentication procedure between a verifying device and a responding device;

FIG. 6 is a flow chart illustrating process steps in a method performed by a second device for receiving a message;

4

Figure 7:
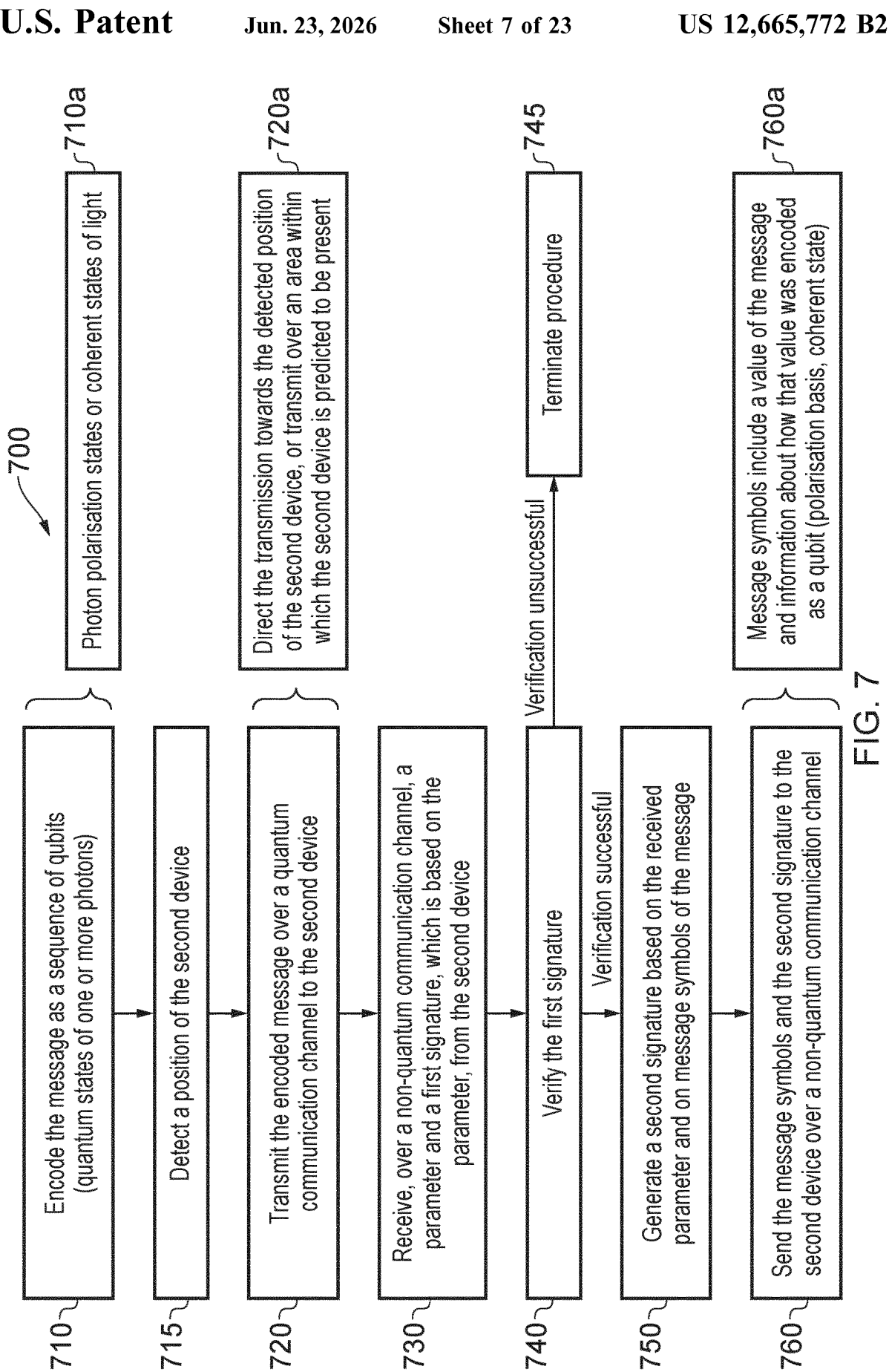
Figure 8B:
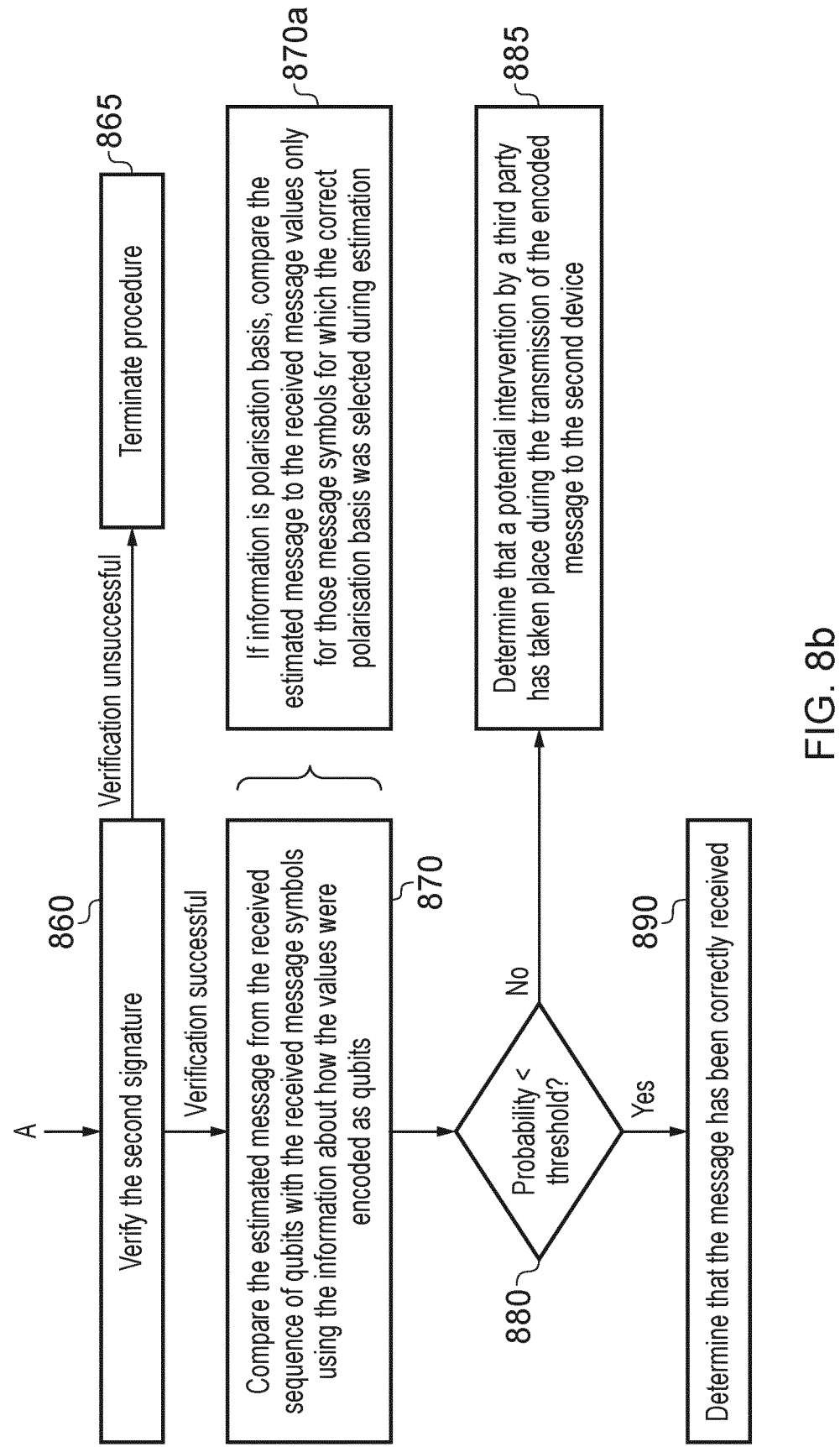
Figure 9:
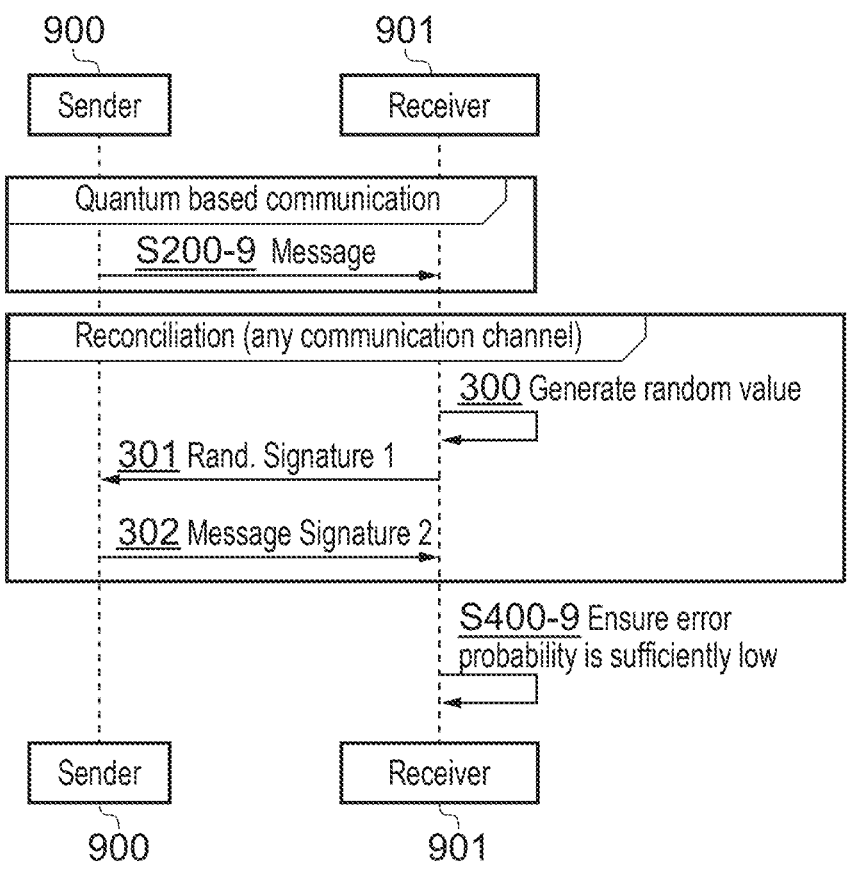
Figure 10A:
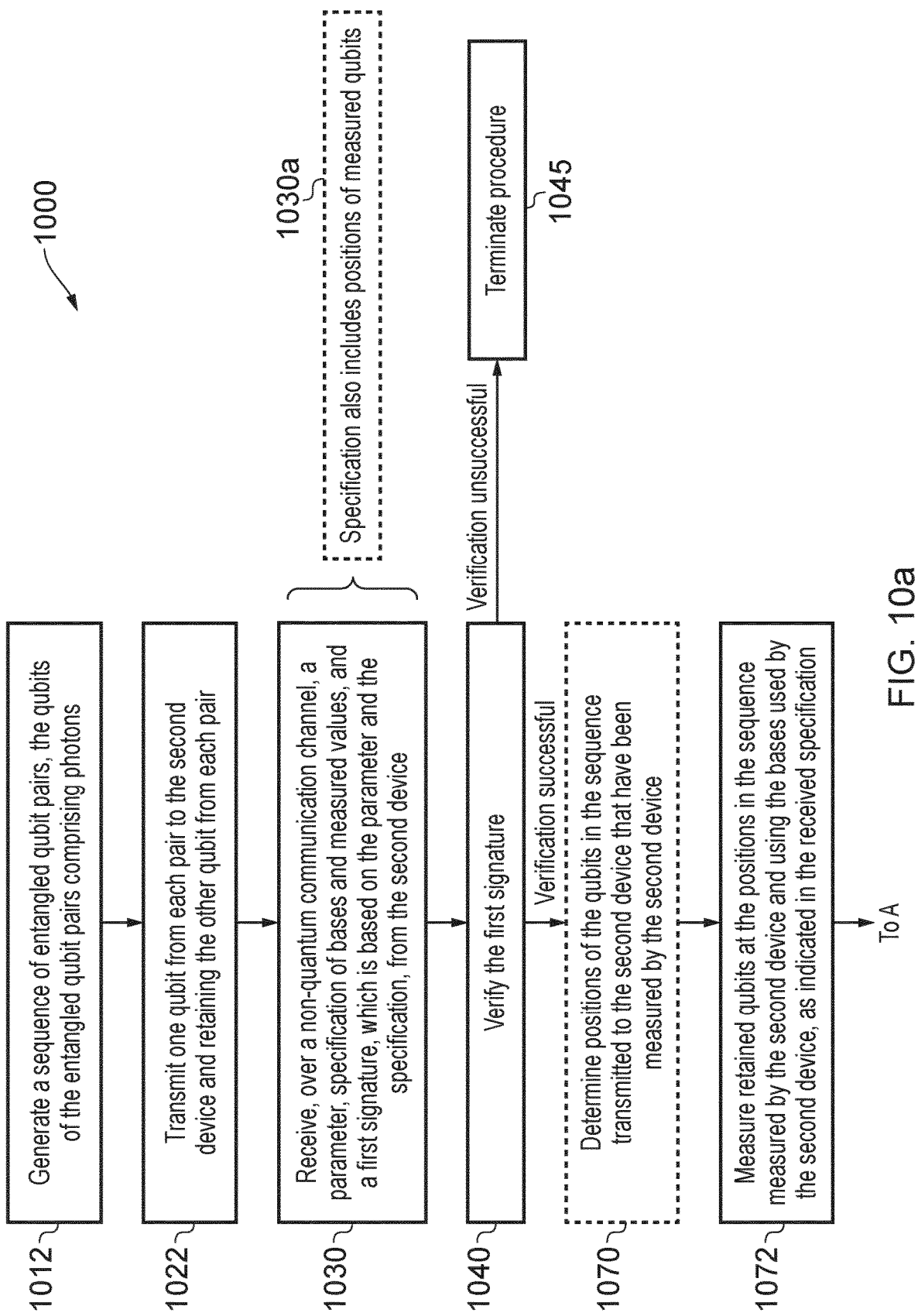
Figure 10B:
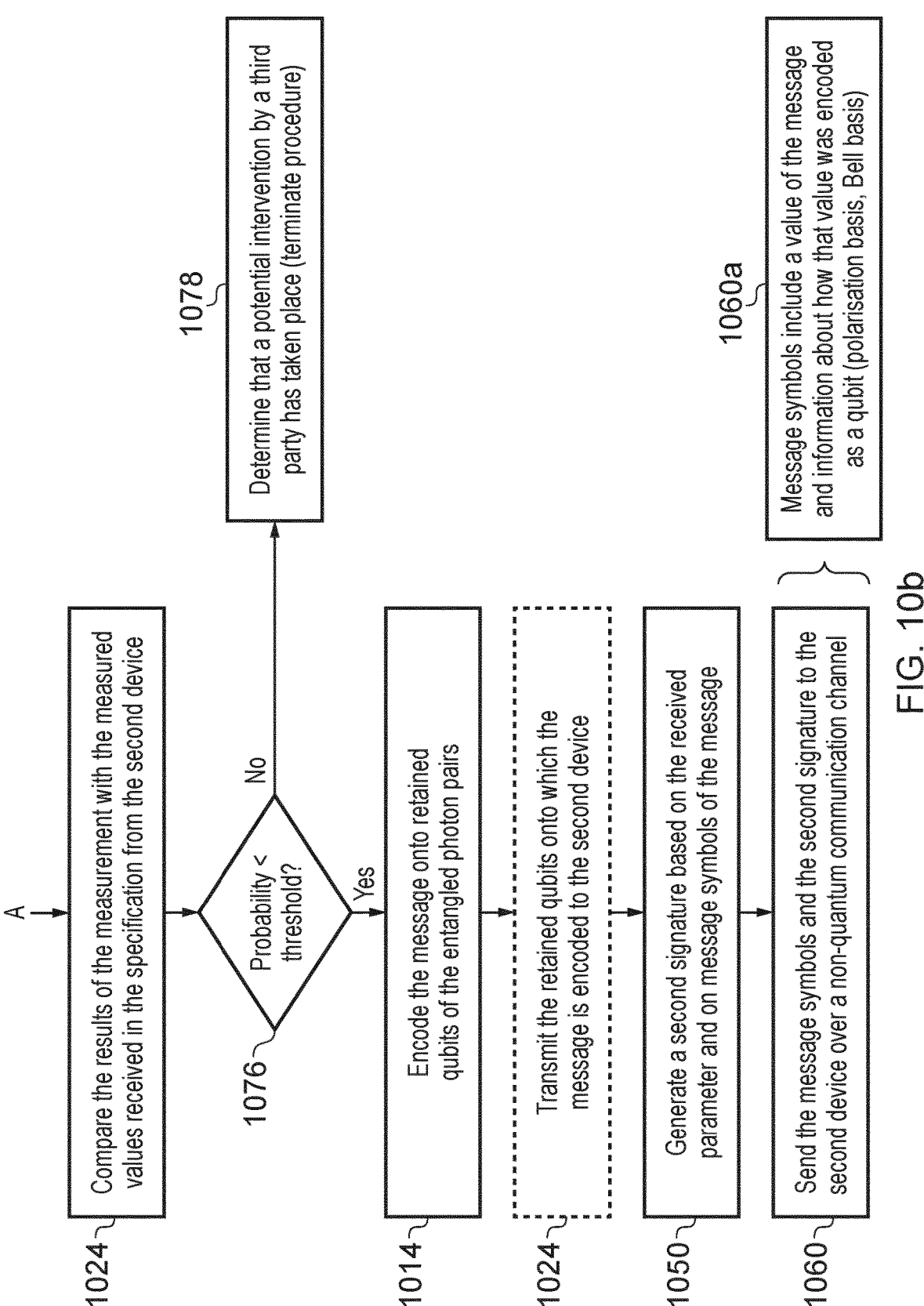
Figure 11B:
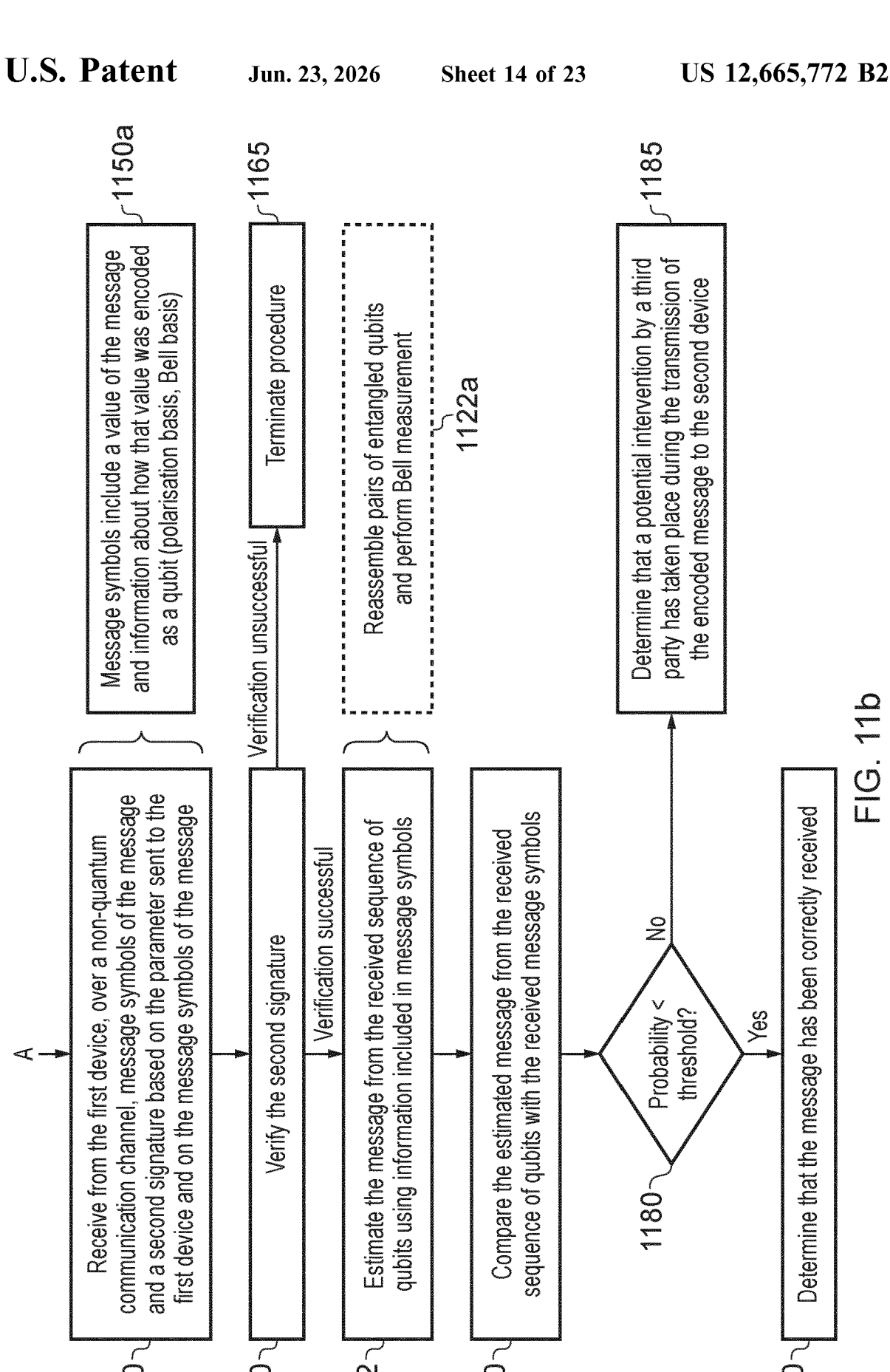
Figure 12:
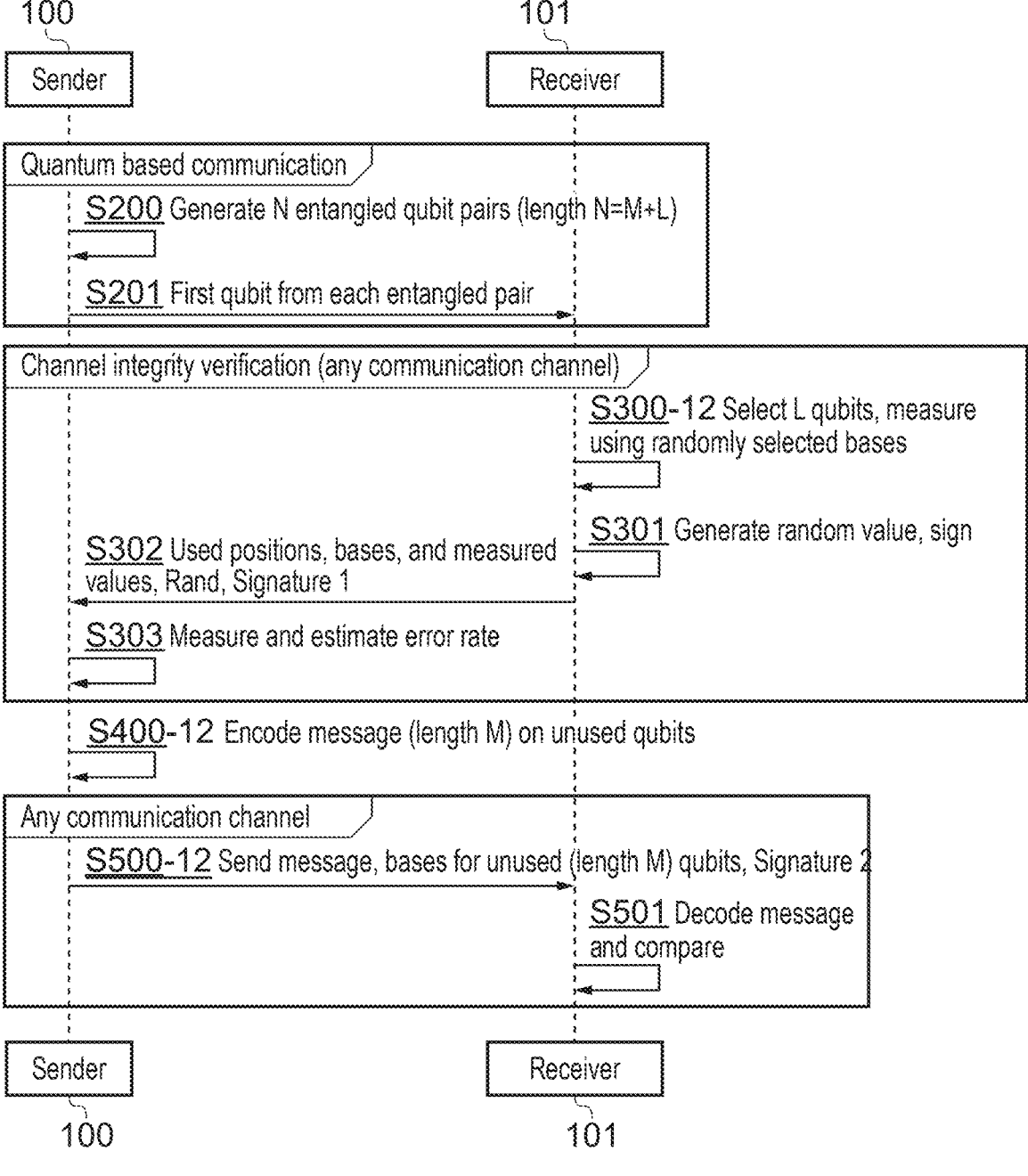
Figure 13:
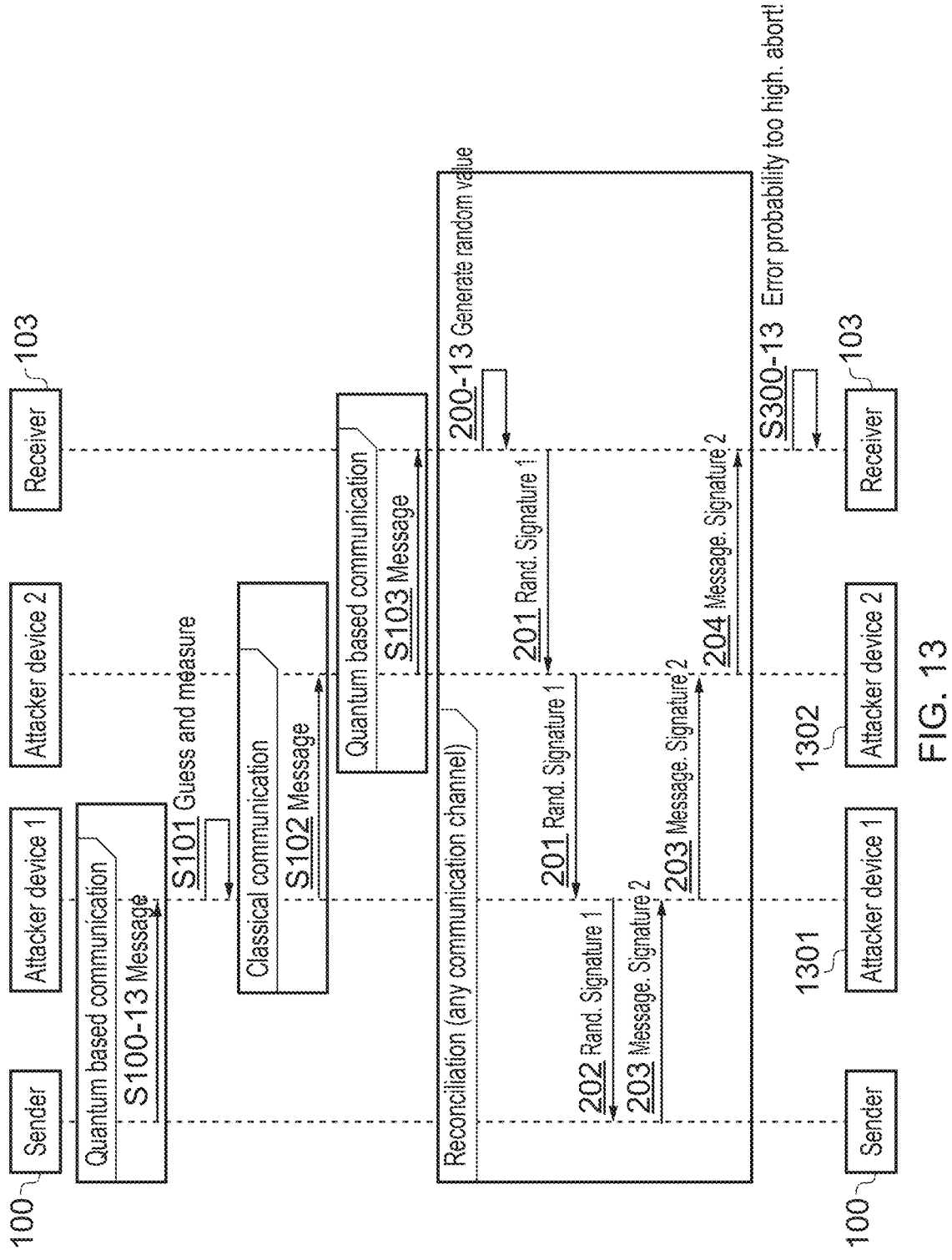
Figure 18:
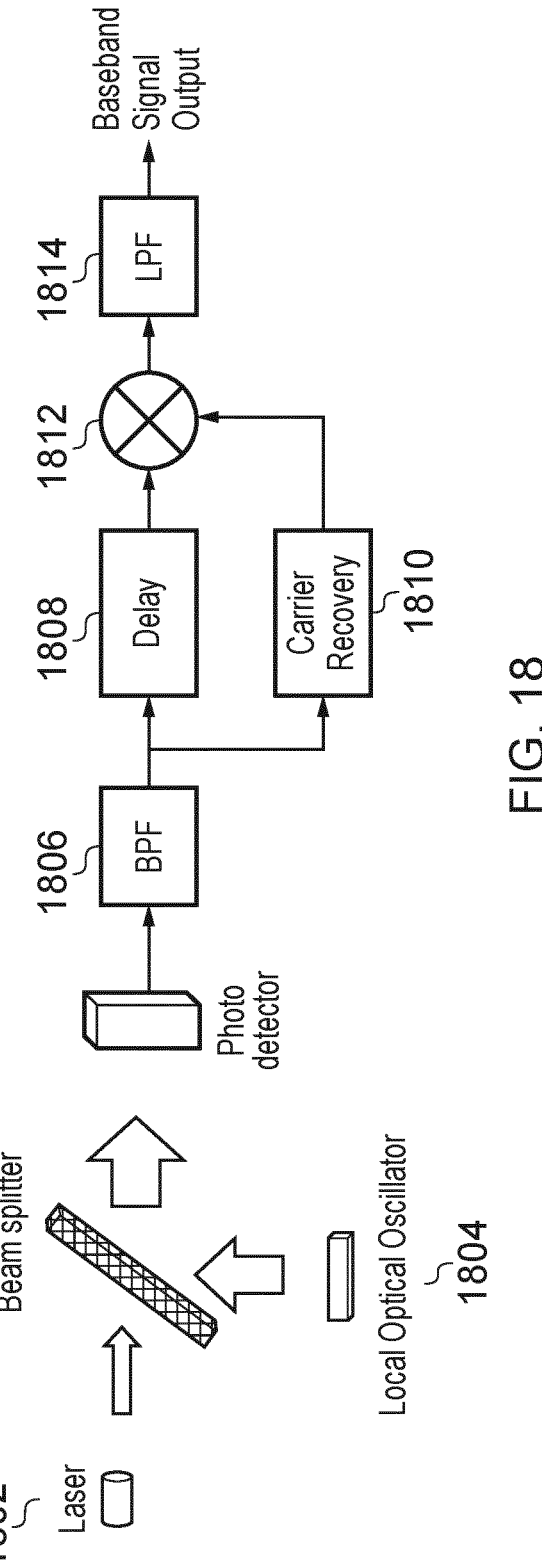

FIG. 7 is a flow chart illustrating process steps in another example of method performed by a first device for delivering a message;

FIGS. 8a and 8b show a flow chart illustrating process steps in another example of method performed by a second device for receiving a message;

FIG. 9 is a message flow diagram illustrating an implementation of the methods of FIGS. 7, 8a and 8b;

FIGS. 10a and 10b show a flow chart illustrating process steps in another example of method performed by a first device for delivering a message;

FIGS. 11a and 11b show a flow chart illustrating process steps in another example of method performed by a second device for receiving a message;

FIG. 12 is a message flow diagram illustrating an implementation of the methods of FIGS. 10a, 10b, 11a and 11b;

FIG. 13 is a message flow diagram illustrating detection of a relay attack;

FIGS. 14 to 17 illustrate use cases for examples of the present disclosure;

FIG. 18 illustrates an example system with a heterodyne detector

Figure 19:
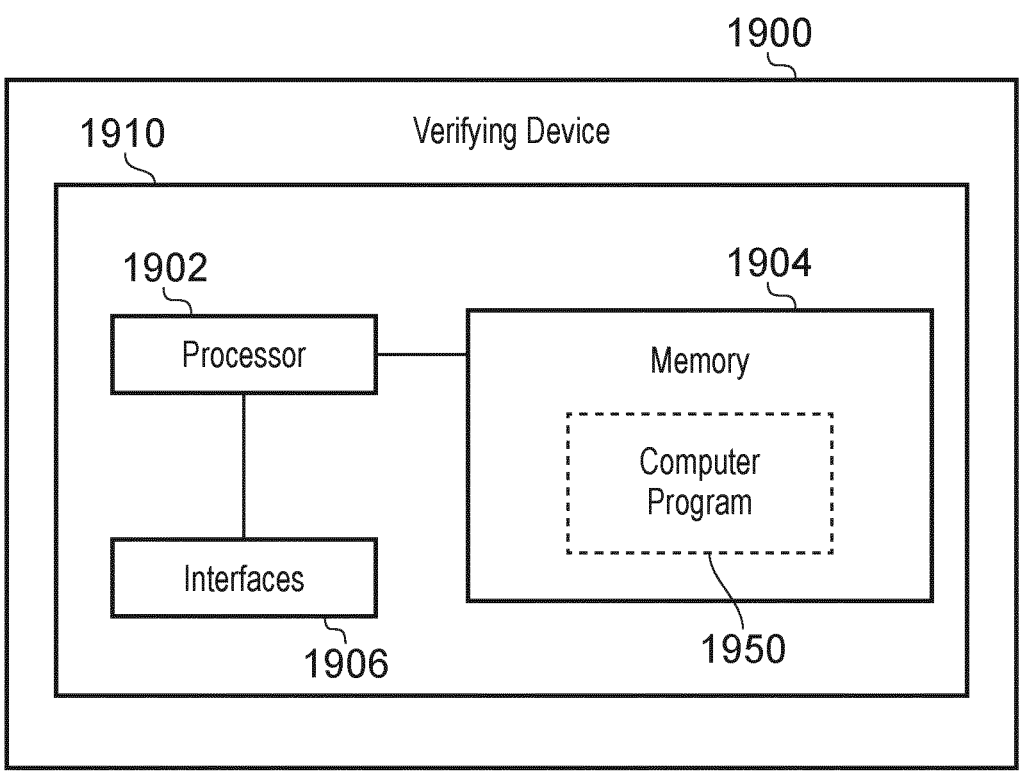
Figure 20:
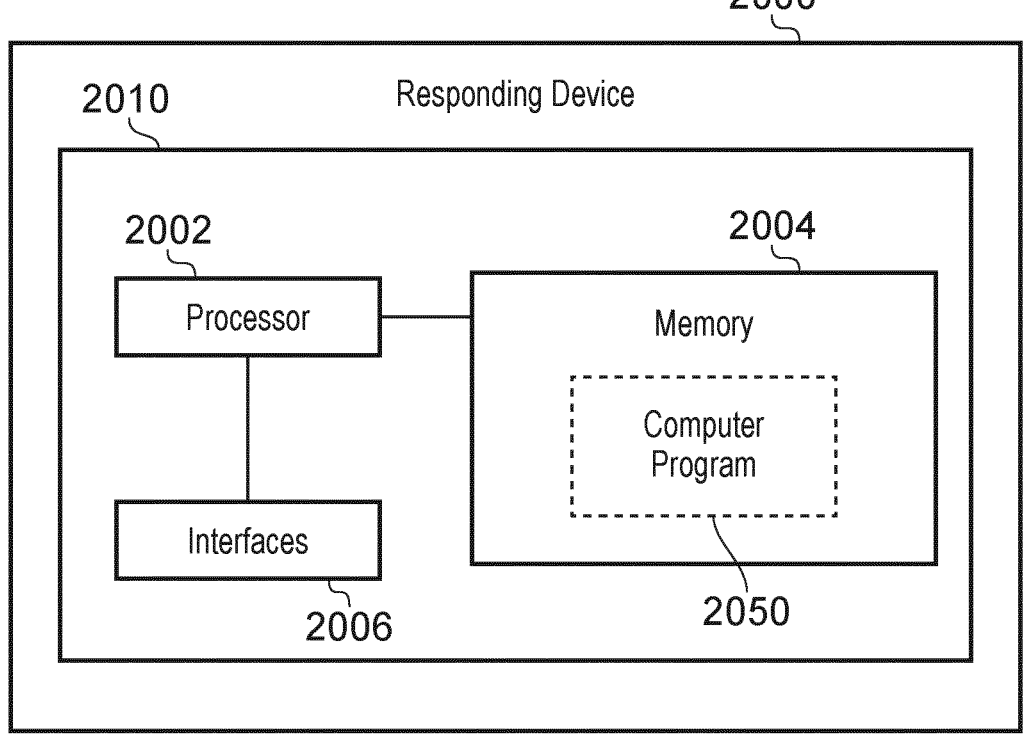
Figures 21, 22:
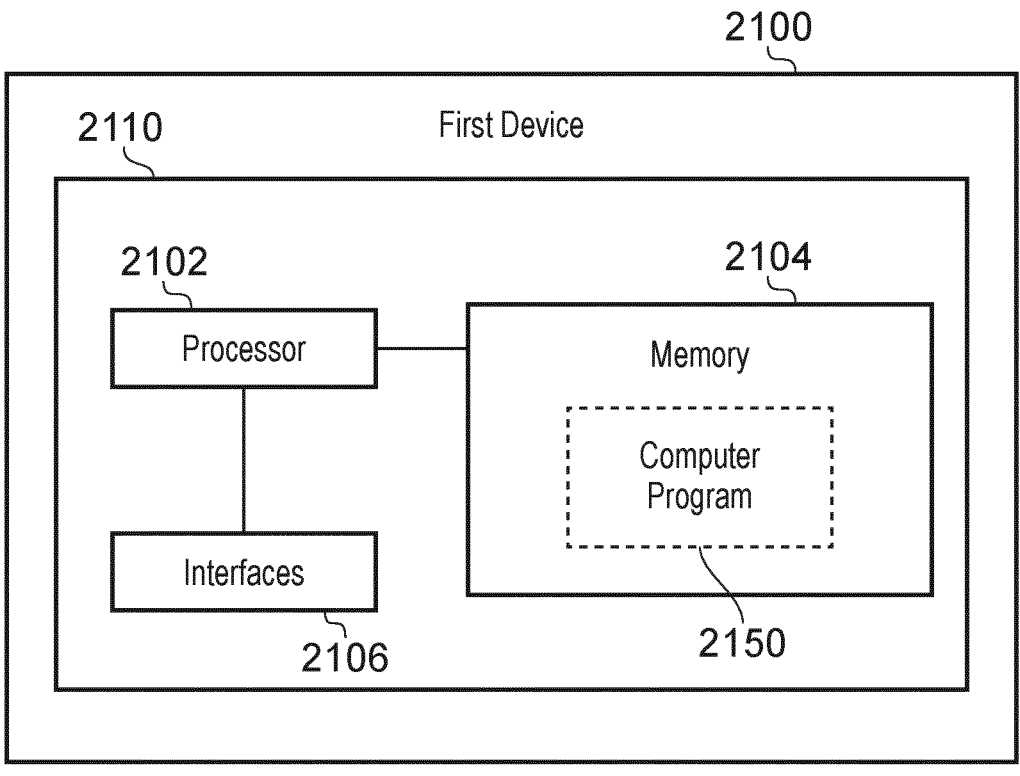

FIG. 19 is a block diagram illustrating functional units in a verifying device;

FIG. 20 is a block diagram illustrating functional units in a responding device;

FIG. 21 is a block diagram illustrating functional units in a first device; and

FIG. 22 is a block diagram illustrating functional units in a second device.

DETAILED DESCRIPTION

Aspects of the present disclosure propose the use of a quantum communication channel to deliver a message, which may be an authentication challenge or an authentication response. Methods according to examples of the present disclosure enable the delivery of a message from a sender to a receiver when the sender and the receiver are in close range, such that any relaying of the message by an attacker will be detected by at least one of the sender or receiver. Examples presented herein detect relay attacks by using photon-based communication instead of radio wave-based communication when delivering a message from a transmitter to a receiver. An attacker seeking to relay communication cannot measure enough information of each quantum state of transmitted photons to be able to correctly retransmit the message to the receiver, and so is forced to guess what would be detected at the receiver.

Examples of the present disclosure may be implemented in a "keyless" system for vehicles. Either the authentication challenge (from the vehicle to the key), or the authentication response (from the key to the vehicle), may be encoded as qubits and delivered using photon—based communication. Owing to the properties of such photon-based communication, the authentication challenge or response cannot be relayed by an attacker to an entity that is not in close range to the transmitter of the challenge or response. The other of the authentication challenge or response may be sent using a non-quantum communication channel, such as radio-based communication for example.

Aspects of the present disclosure incorporate some features of Quantum cryptography, including the Quantum Key Distribution (QKD) protocol and the Quantum Secure Direct Communication (QSDC) protocol. To provide additional context for the present disclosure, a brief discussion of these protocols is provided below.

The Quantum Key Distribution (QKD) protocol is a quantum cryptography protocol for establishing a shared secret key between two parties by sending quantum states. Quantum key distribution exploits certain properties of these quantum states to ensure its security. There are several different approaches to quantum key distribution using different quantum state properties. Of particular interest to the present disclosure are protocols that exploit the quantum state property that measuring an unknown quantum state changes that state in some way (a consequence of quantum indeterminacy). In QKD, this property is exploited to detect any eavesdropping on communication, which would necessarily involve measurement. The Discrete Variable Quantum Key Distribution (DV-QKD) protocol, often only called Quantum Key Distribution (QKD), uses single photons as information carriers and single photon detectors at the receiver. Continuous Variable Quantum Key Distribution (CV-QKD) is a promising alternative to DV-QKD. Instead of working with individual photons, CV-QKD uses several photons for each information bit. In CV-QKD, the information encoding is in the amplitude and phase of the light, and a homodyne or heterodyne detector is used at the receiver. The detector measures the quadratures of the electric field of the light.

DV-QKD

Each single photon can, by using different polarization, be randomly encoded as one out of two pairs, in which each pair represents a polarization basis, and one pair is the conjugate of the other pair. The states within a pair, that together form a basis, are orthogonal to each other. Examples of polarization bases are the rectilinear basis (0°, 90°) and the diagonal basis (45°, 135°). An attacker cannot measure one of these states without disturbing the original state, and hence, can only measure the polarization in one basis at a time. This property is used in DV-QKD, according to which a transmitter first sends a number of photons to a receiver without revealing the randomly chosen basis used for each photon. The receiver notifies the transmitter over a public channel (which may be radio based communication or light-based communication) that the receiver has detected the photons. On receipt of this notification, the transmitter reveals on a public channel the basis that it used for the photons transmitted. Before knowing the basis used by the transmitter, the receiver has already measured the states of each photon using a basis of its own choice (e.g. at random) for each photon. The receiver responds on the public channel by indicating for which of the photons he used the correct basis for measurement. The random bits for these photons are then used as a shared secret between the sender and the receiver.

CV-QKD

A system using CV-QKD comprises a predefined set of possible quantum states, where the states (amplitude and phase) have been chosen such that their distributions are overlapping. A sender transmits a sequence of randomly selected states. Owing to the overlapping distributions, an attacker that seeks to relay or tamper with the message must guess, for each state, which quantum state has been sent. When the entire sequence has been received, the receiver discloses a random fraction of its measurements to the sender, on a public channel. The sender can then reveal which states were sent for the random fraction disclosed by the receiver. With the knowledge of the correct states, the receiver can now investigate the distribution of amplitude and phase for those states and calculate the variance of the distribution. If the variance is above the expected variance, the receiver knows that the something went wrong in the transmission and has to assume that an attacker tampered with the quantum states along the way. Error correction is then used on the non-revealed part of the quantum states to correct any errors in the transmission, and privacy amplification is then used to reduce the key length with the same amount that leaked due to error correction. These steps are also performed on a public channel.

The Quantum Secure Direct Communication (QSDC) protocol is a quantum cryptography protocol for transmitting secret information directly through a quantum channel without the use of a ciphering key and without transmitting the information in encrypted form. The QSDC protocol may be implemented with the use of entangled photons. According to QSDC, a sender wishes to send a message of M bits and generates a sequence of N=M+L entangled qubit pairs (for example entangled photon pairs) where L is a set of extra qubit pairs for error detection. The positions of the L qubit pairs are randomly selected in the sequence of N qubit pairs. The sender sends the first qubit from each pair to the receiver, which acknowledges the receipt of the qubits to the sender. The sender then chooses a fraction of the L qubit pairs (for example half of them) and measures their value using a randomly selected basis (for example a photon polarization basis). The sender notifies the receiver of the positions of the selected qubit pairs, and the receiver measures the selected fraction of the L qubits using bases that are randomly selected by the receiver. The receiver then provides the used bases and measured values to the sender, and the sender estimates the error rate based on the qubits that were measured in the same bases by both sender and receiver. If the error rate is below a certain threshold the sender assumes no attacker is interfering with the communication. The sender then encodes the message on the unused second qubits, and sends the second qubits of each of the N qubit pairs to the receiver. The receiver may now pair up the qubits and do a Bell measurement to extract the message. The receiver provides the measurement results of the remaining of the L qubit pairs for estimation of the error rate. If the error rate is below a certain threshold the sender assumes no interference from an attacker. It will be appreciated that an attacker may never obtain the actual message (or part of the message) but may only destroy the communication.

Figure 1:
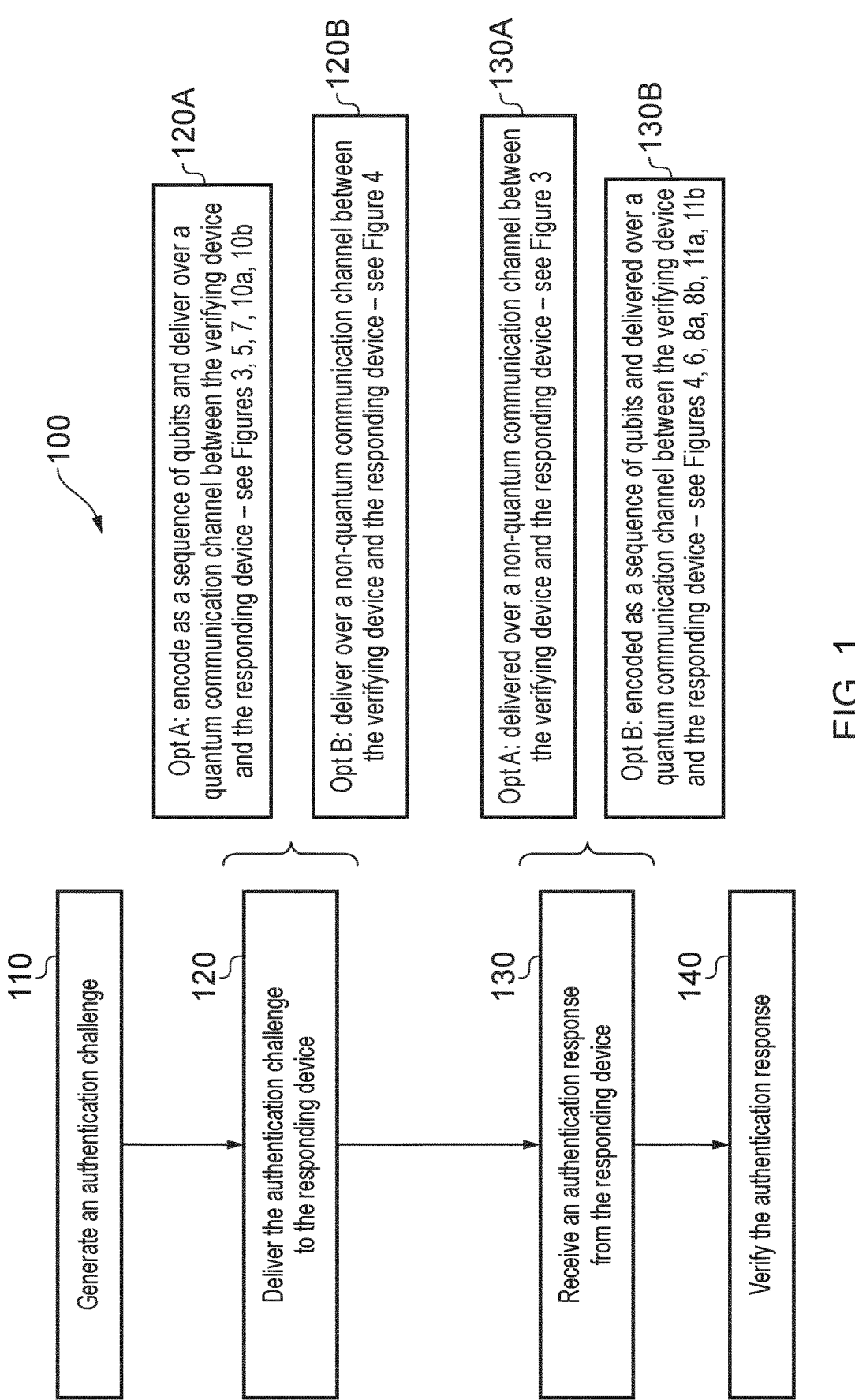
FIG. 1 is a flow chart illustrating process steps in a method, performed by a verifying device, for performing an authentication procedure between a verifying device and a responding device.

FIGS. 1 and 2 are flow charts illustrating process steps in methods 100, 200 for performing an authentication procedure between a verifying device and a responding device, wherein the verifying and responding devices are provisioned with security credentials. The credentials may be suitable for enabling authenticated and integrity protected traffic between the verifying and responding devices. The security credentials may for example be asymmetric key pairs or a shared symmetric key. FIG. 1 illustrates a method 100 performed by a verifying device, and FIG. 2 illustrates a method 200 performed by a responding device.

Referring initially to FIG. 1, in a first step 110, the verifying device generates an authentication challenge. The authentication challenge may take any appropriate form according to the nature of the authentication procedure being conducted. In step 120, the verifying device delivers the authentication challenge to the responding device. In step 130, the verifying device receives an authentication response from the responding device, and, in step 140, the verifying device verifies the authentication response. As illustrated at steps 120A, 120B, 130A and 130B, at least one of the authentication challenge or authentication response is encoded as a sequence of qubits and delivered over a quantum communication channel between the verifying device and the responding device, and the other of the authentication challenge or authentication response may be delivered over a non-quantum communication channel between the verifying device and the responding device. These options are illustrated as Option A and Option B. According to Option A (steps 120A and 130A), the authentication challenge is encoded as a sequence of qubits and delivered over a quantum communication channel between the verifying device and the responding device, and the authentication response is delivered over a non-quantum communication channel between the verifying device and the responding device. According to Option B, the authentication challenge is delivered over a non-quantum communication channel between the verifying device and the responding device, and the authentication response is encoded as a sequence of qubits and delivered over a quantum communication channel between the verifying device and the responding device.

FIG. 2 illustrates a corresponding method 200 performed by a responding device. Referring to FIG. 2, in a first step 210, the responding device receives an authentication challenge from the verifying device. In step 220, the responding device generating an authentication response based on the authentication challenge, and, in step 230, the responding device delivers the authentication response to the verifying device. As illustrated at steps 210A, 210B, 230A and 230B, at least one of the authentication challenge or authentication response is encoded as a sequence of qubits and delivered over a quantum communication channel between the verifying device and the responding device, and the other of the authentication challenge or authentication response may be delivered over a non-quantum communication channel between the verifying device and the responding device. These options are illustrated as Option A and Option B as set out above.

Additional details of how the authentication challenge and authentication response of the methods 100 and 200 may be delivered and received according to different examples of the present disclosure are discussed below, with reference to FIGS. 3 to 11b.

According to examples of the methods 100 and 200, the sequence of qubits onto which the authentication challenge or response is encoded may comprise a sequence of quantum states of one or more photons. The quantum states of one or more photons may comprise at least one of photon polarisation states (as used in DV-QKD), entangled states of photon pairs (as used in QSDC), or (overlapping) coherent states of light (as used in CV-QKD). Other physical realisations of qubits for encoding of the authentication challenge or response may also be envisaged.

The methods 100 and 200 may further comprise verifying, by either or both of the verifying device or responding device, that a probability that the at least one of the authentication challenge or authentication response that is encoded as a sequence of qubits and delivered over a quantum communication channel between the verifying device and the responding device has been relayed by a third party is below a threshold value. Different methods for implementing this verification are discussed below.

According to one use case for the methods 100, 200, at least one of the verifying device or responding device may be associated with a vehicle. The other of the verifying or responding device may for example be associated with a key, a barrier, a building, etc. The authentication procedure performed according to the methods 100, 200 may for example be for allowing at least one of unlocking of a vehicle, control of a vehicle, access for a vehicle to a restricted access area etc. Examples of restricted access areas may include a residential or commercial garage, residential building complex, gated community, industrial, commercial or government complex etc.

Figure 3:
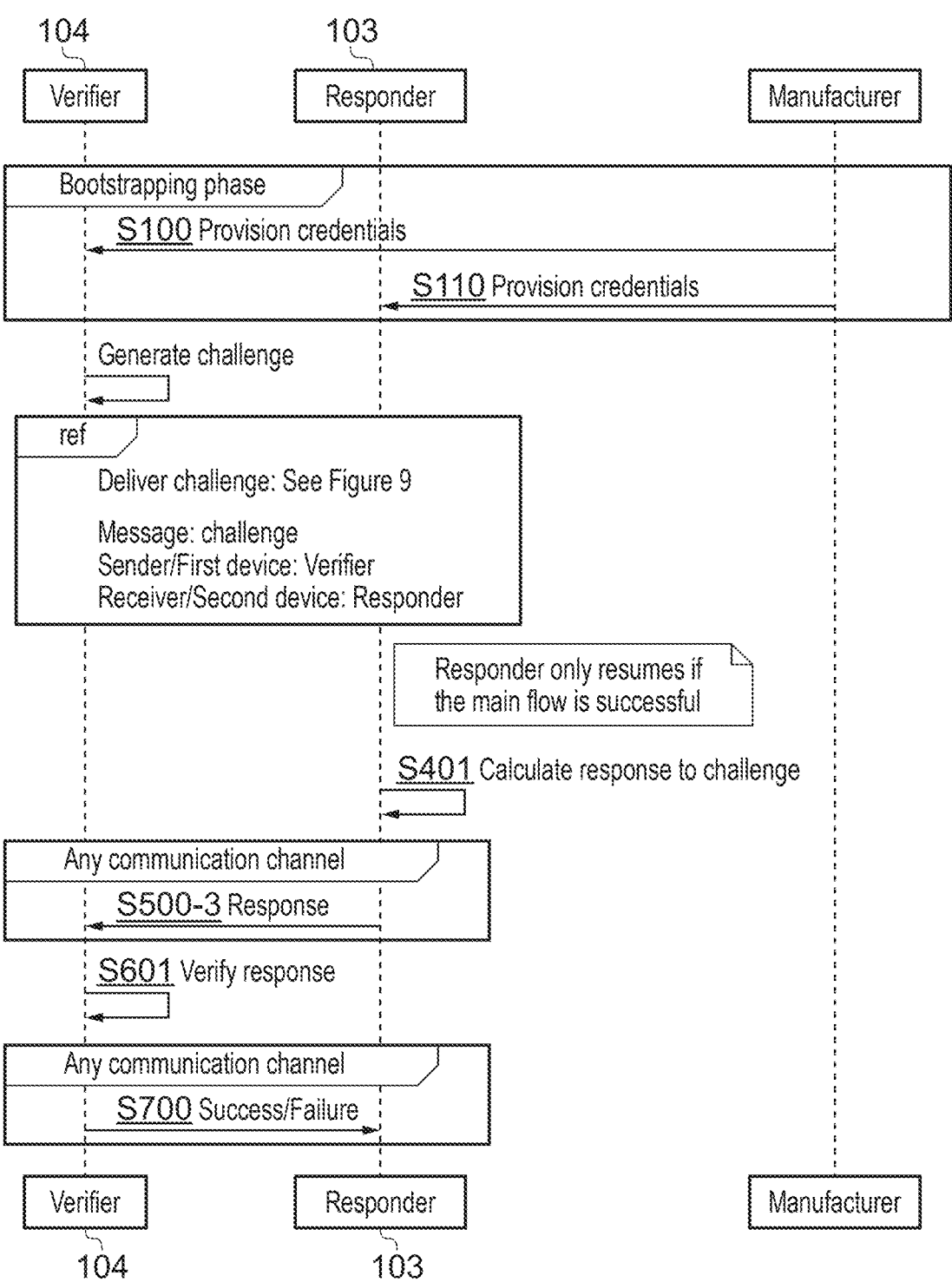
FIG. 3 is a message flow diagram illustrating challenge-response based authentication in which the authentication challenge is relay protected.
Figure 4:
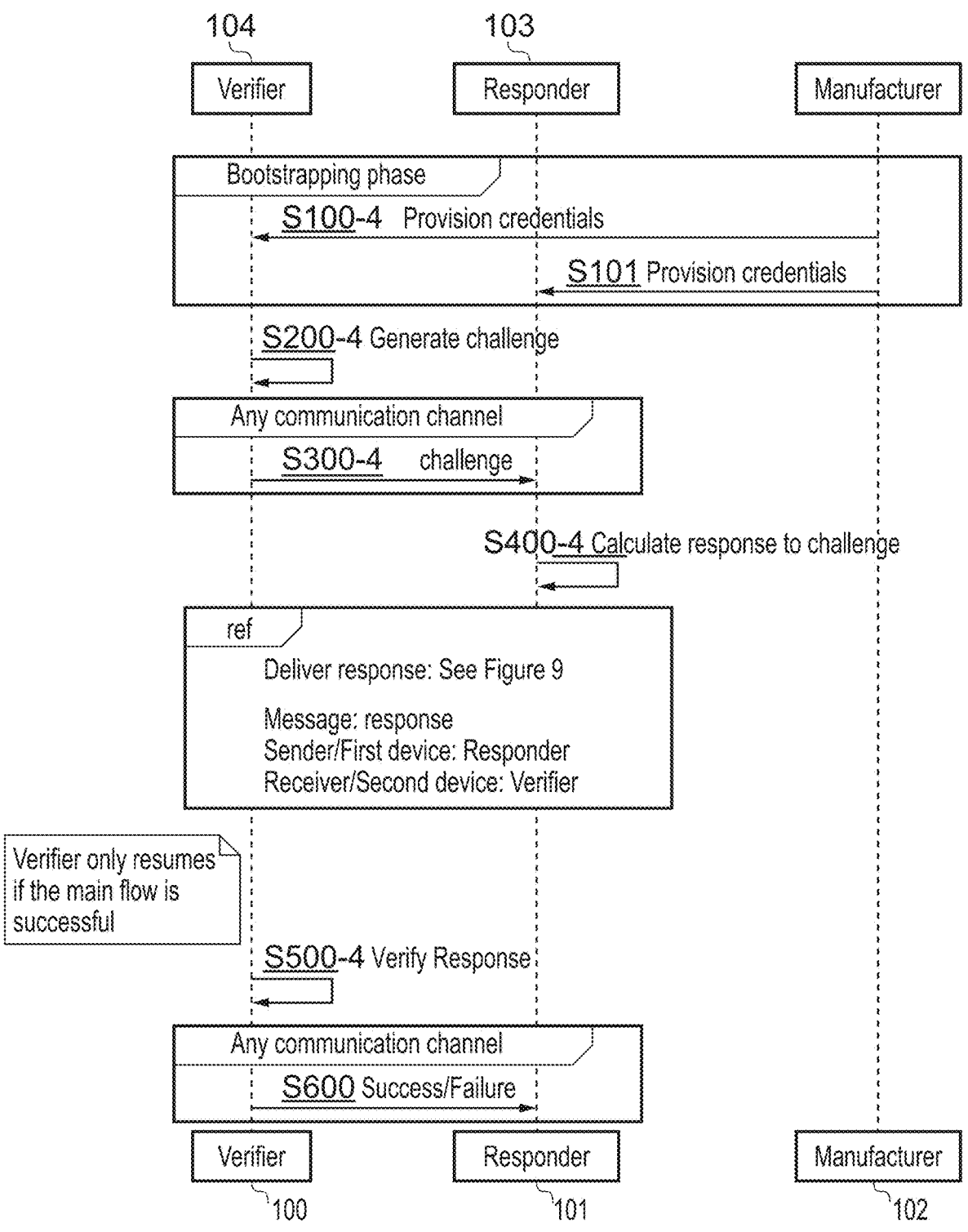
FIG. 4 is a message flow diagram illustrating challenge-response based authentication in which the authentication response is relay protected.

FIGS. 3 and 4 are message flow diagrams illustrating options A and B respectively of the methods 100 and 200.

FIG. 3 is a message flow diagram illustrating challenge-response based authentication in which the authentication challenge is relay protected according to examples of the methods 100 and 200. The illustrated example involves a verifying device, or verifier 104, and responding device or responder 103. The verifying device is equipped with a light transmitter and the responding device is equipped with a light receiver. In some examples, the verifying device and responding device may be associated respectively with a vehicle and vehicle key, or building/barrier and vehicle seeking access, etc.

Referring to FIG. 3, in an initial bootstrapping phase, the verifying device 104 and responding device 103 are each provisioned with security credentials by a manufacturer of the devices (steps S100 and S110). The verifying device 104 then generates an authentication challenge and the above described methods 100 and 200 are used to transfer an authentication request containing the authentication challenge from the verifying device to the responding device in such a manner that relay of the authentication challenge is not possible. The detail of these steps is described below and illustrated for example in FIGS. 9 and 12. The responding device 103 only continues with the authentication procedure if the authentication challenge is successfully received in such a manner that it may be assumed that no relay of the authentication challenge has taken place. In step S401, the responding device calculates an authentication response to the challenge. The response may for example be a signature on the challenge, either a public-key based signature (if the security credential is an asymmetric key and the signature is created using the private part of the key) or a Message Authentication Code (MAC) (if the security credential is a symmetric key). In step S500-3, the authentication response is returned to the verifier via any suitable communication channel, including for example radio wave-based communication, WiFi, etc. In step S601, the verifying device verifies the response, for example by verifying the signature of the responding device. In step S700, the verifying device may respond to the responding device with the status (Success/Failure) of the authentication.

FIG. 4 is a message flow diagram illustrating challenge-response based authentication in which the authentication response is relay protected according to examples of the methods 100 and 200. In this illustrated example, the responding device is equipped with a light transmitter and the verifying device is equipped with a light receiver. This arrangement may be appropriate if the verifying device is more constrained than the responding device. In some examples, the verifying device and responding device may be associated respectively with a vehicle and vehicle key, building/barrier and vehicle, etc.

Referring to FIG. 4, a similar initial bootstrapping phase is conducted in steps S100-4 and S101, and the verifying device 104 then generates an authentication challenge in step S200-4. In the example of FIG. 4, the authentication challenge is delivered to the responding device in step S300-4 via any suitable communication channel, including for example radio wave-based communication, WiFi, etc. In step S400-4, the responding device calculates an authentication response to the challenge. The response may for example be a signature on the challenge. The above described methods 100 and 200 are then used to transfer the authentication response from the responding device to the verifying device in such a manner that relay of the authentication response is not possible. The detail of these steps is described below and illustrated for example in FIGS. 9 and 12. The verifying device only continues with the authentication procedure if the authentication response is successfully received in such a manner that it may be assumed that no relay of the authentication response has taken place. In step S500-4, the verifying device verifies the response, for example by verifying the signature of the responding device. In step S600, the verifying device may respond to the responding device with the status (Success/Failure) of the authentication.

Figure 5:
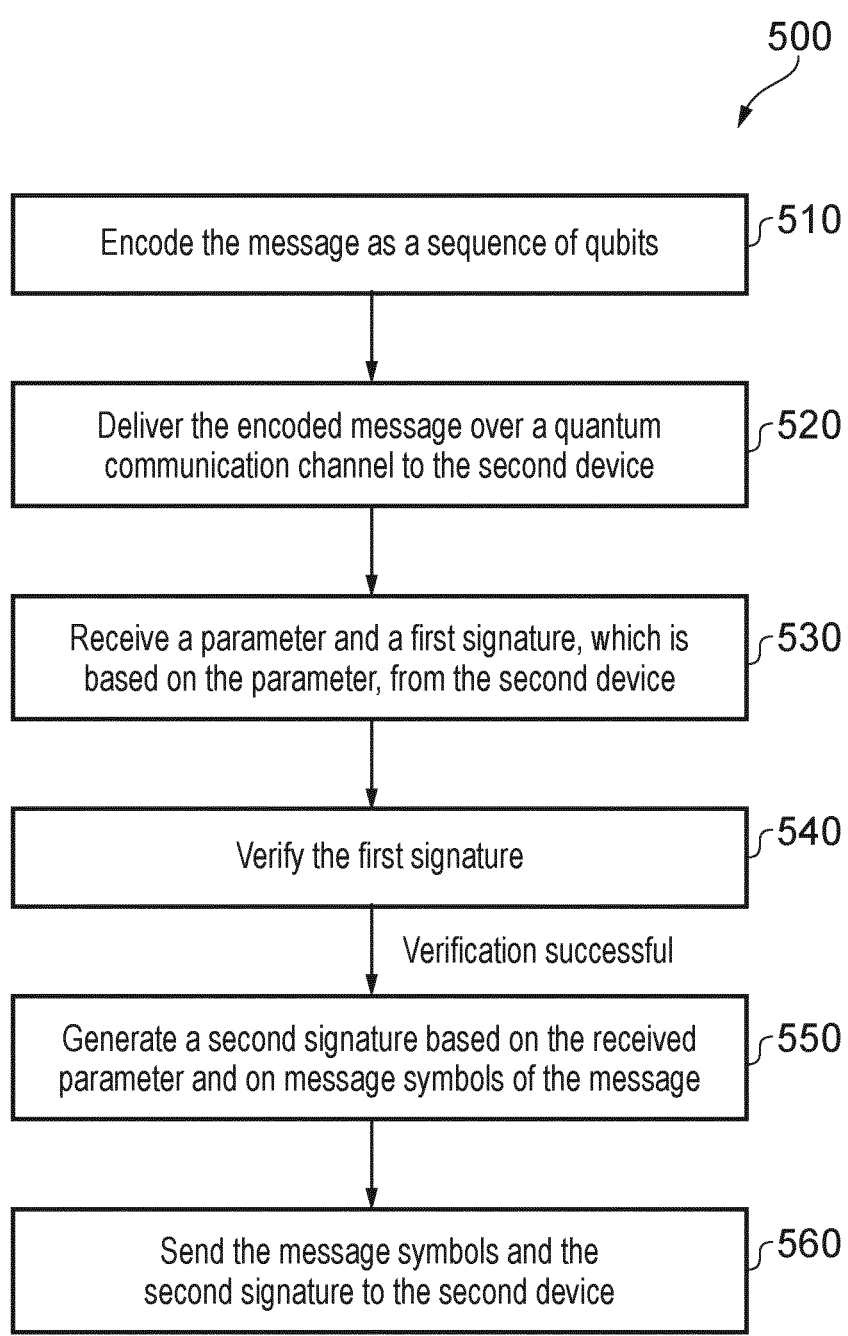
FIG. 5 is a flow chart illustrating process steps in a method performed by a first device for delivering a message.

FIGS. 5 and 6 are flow charts illustrating process steps in methods for delivering and receiving a message according to examples of the present disclosure. The methods of FIGS. 5 and 6 may be used to deliver and receive a message such as an authentication challenge or authentication response, as described above, over a quantum communication channel in such a manner that relay of the message may be prevented. The method 500 is performed by a first, sending, device, and the method 600 is performed by a second, receiving device. It will be appreciated that either of a verifying device or responding device discussed above with reference to FIGS. 1 to 4 may perform either of the methods 500 or 600, according to whether the message being transferred between the devices is an authentication challenge (verifying device acts as the first, sending device and responding device acts as the second, receiving device), or an authentication response (responding device acts as the first, sending device and verifying device acts as the second, receiving device).

In some examples, at least one of the first or second devices may be associated with a vehicle, the message may be an authentication challenge or authentication response of an authentication procedure, and the authentication procedure may be for allowing at least one of unlocking of a vehicle, control of a vehicle and/or access for a vehicle to a restricted access area such as a garage or residential, industrial, commercial or government complex.

In other examples of the present disclosure the message exchanged according to the methods 500 and 600 may not be part of an authentication procedure, and may be any message that an entity seeks to deliver in such a way as to ensure proximity between sender and receiver, and so to prevent a relay attack.

Referring initially to FIG. 5, this Figure illustrates process steps in a method 500, performed by a first device, for delivering a message to a second device, wherein the first and second devices are provisioned with security credentials. In a first step 510, the first device encodes the message as a sequence of qubits, before delivering the encoded message over a quantum communication channel to the second device in step 520. The quantum communication channel may for example be free space, which is a suitable channel for transmitting physical implementation of qubits that are based on photons. In step 530, the first device receives a parameter and a first signature, which is based on the parameter, from the second device. In step 140, the first device verifies the first signature, for example using a shared security credential, and, if the verification of the first signature is successful, the first device generates a second signature based on the received parameter and on message symbols of the message. Depending on the type of security credentials, the first signature and second signature may either be in the form of a public-key based signature (if the security credential is an asymmetric key and the signature is created using the private part of the key) or a Message Authentication Code (MAC) (if the security credential is a symmetric key). In step 560, the first device sends the message symbols and the second signature to the second device. In will be appreciated that in certain examples of the present disclosure, one or more of the steps of the method 500 may be performed simultaneously with another step, or may be performed in a different order to that which is described above. Such examples are discussed in further detail below with reference to FIGS. 10a to 11b.

Referring now to FIG. 6, this Figure illustrates a method 600 for receiving a message from a first device, wherein the method is performed by a second device, and wherein the first and second devices are provisioned with security credentials. The method 600 thus complements the method 500. In a first step 610, the second device receives an encoded message from the first device, wherein the encoded message comprises a sequence of qubits and is received over a quantum communication channel to the first device. In step 620, the second device estimates the message from the received sequence of qubits. The second device generates a first signature based on a parameter in step 630, and, in step 640, sends the first signature and the parameter to the first device. In step 650, the second device receives from the first device message symbols of the message and a second signature based on the parameter sent to the first device and on the message symbols of the message. In step 660, the second device verifies the second signature, and, if the verification of the second signature is successful, the second device compares the estimated message from the received sequence of qubits with the received message symbols in step 670. If a probability of error between the estimated message and the received message symbols is below a threshold value (step 680), the second device determines that the message has been correctly received.

It will be appreciated that the exchange of first and second signatures in the methods 500 and 600 avoids the possibility of either the first device being fooled into revealing the message symbols before the receiver has estimated the encoded message, or an attacker being able to manipulate the message symbols to reflect a relayed encoded message. This is discussed in greater detail with reference to FIG. 13 below.

FIGS. 7, 8a and 8b are flow charts illustrating one way in which the steps of the methods 500 and 600 may be implemented and supplemented in order to achieve the above discussed and additional functionality. The methods 700 and 800, illustrated in FIGS. 7, 8a and 8b, illustrate implementation of the methods 500 and 600 using qubit realizations similar to those employed in DV-QKD or CV-QKD. FIGS. 10a to 11b illustrate a different implementation of the methods 500 and 600, using entanglement based protocols similar to those employed in QSDC. It will be appreciated that in all of these implementations, and in contrast to the protocols for DV-QKD, CV-QVD and QSDC, the message itself is used for error check and to determine a probability of relay. This is possible owing to the fact that the methods of the present disclosure are not concerned with the secrecy of the message that is exchanged, but rather with ensuring proximity of sender and receiver, thus detecting and preventing relay attacks. This is in contrast for example to QKD methods, in which at least part of the message that is exchanged forms the basis for generating a secret key for use by the sender and receiver, and so must remain secret.

FIG. 7 illustrates process steps in a method 700, performed by a first device, for delivering a message to a second device, wherein the first and second devices are provisioned with security credentials. The message may be an authentication challenge, authentication response, or any other type of message.

Referring to FIG. 7, in a first step 710, the first device encodes the message as a sequence of qubits. In the illustrated example, the qubits comprise quantum states of one or more photons. As illustrated at step 710*a*, the quantum states of one or more photons comprise may comprise at least one of non-orthogonal photon polarisation states or coherent states of light, which may be overlapping. In other examples (illustrated in FIGS. 10*a* to 11*b*), the quantum states of one or more photons may comprise entangled states of photon pairs.

In step 715, the first device may detect a position of the second device, and in step 720, the first device transmits the encoded message over a quantum communication channel to the second device. If the first device has detected the position of the second device, the first device may direct the transmission of the encoded message towards the detected position of the second device in step 720*a*. In some examples, position detection may be most appropriate for implementations in which the message is encoded using photon polarisation states. In such implementations, directing the transmission of the encoded message towards the detected position of the second device may comprise collimating the beam of light in the direction of the detected position, for example using a laser beam with a rotating mirror.

In other examples, the first device may transmit the encoded message over an area within which the second device is predicted to be present, as illustrated in step 720*a*. This action may be most appropriate for implementations in which the message is encoded using coherent states of light. In such implementations, transmitting the encoded message over an area within which the second device is predicted to be present may comprise illuminating an area around the first device with the distribution of photons forming the coherent states.

In step 730, the first device receives a parameter and a first signature, which is based on the parameter, from the second device. The parameter may for example be a random or pseudo random number generated by the second device. As illustrated in step 730, the parameter and the first signature are received over a non-quantum communication channel. Examples of a non-quantum communication channel may include any communication channel and protocol such as, for example, radio based (including 2G, 3G, 4G, Bluetooth, WiFi or other proprietary protocols), Ethernet, fiber, wired telephone etc.

In step 740, the first device verifies the first signature, for example using a shared security credential. If verification of the first signature is not successful, the first device terminates the method. If the verification of the first signature is successful, the first device generates a second signature based on the received parameter and on message symbols of the message in step 750. The first device then sends the message symbols and the second signature to the second device in step 760. As illustrated in step 760, the message symbols and the second signature are sent over a non-quantum communication channel, which may be the same non-quantum communication channel as was used for receiving the parameter and first signature from the second device.

As illustrated at 760*a*, a message symbol of the message comprises at least one of a value of the message and information about how that value was encoded as a qubit. The information about how a value was encoded as a qubit may vary according to the physical realisation of the qubit but may for example comprise at least one of a polarisation basis used with the message value to generate a photon polarisation state, or the coherent state used to encode the message value. As discussed above, the polarisation basis used to generate a photon polarisation state comprises a pair of states, wherein the two states within a pair are orthogonal to each other and wherein the pair is one of two pairs of states that may be used by the second device, each pair conjugate to the other pair. The rectilinear basis, diagonal basis and circular basis are all examples of pairs of states that form a polarisation basis.

FIGS. 8*a* and 8*b* illustrate a method 800 for receiving a message from a first device, the method performed by a second device, wherein the first and second devices are provisioned with security credentials. The method 800 is complementary to the method 700 described above. Referring to FIG. 8*a*, in a first step 810, the second device receives an encoded message from the first device, wherein the encoded message comprises a sequence of qubits and is received over a quantum communication channel to the first device. As illustrated in step 810, the qubits comprise quantum states of one or more photons, and may comprise at least one of photon polarisation states or coherent states of light, which may be overlapping. In other examples (illustrated in FIGS. 10*a* to 11*b*), the quantum states of one or more photons may comprise entangled states of photon pairs.

In step 820, the second device estimates the message from the received sequence of qubits. As illustrated in steps 820*a* and 820*b*, this may comprise at least one of:

a) for each received quantum state of one or more photons, selecting a polarisation basis in which to measure the state and measuring the received quantum state of one or more photons in the selected basis; or b) for received coherent states of light, for each received coherent state of light, measuring at least one of an amplitude or a phase of the light and estimating a quantum state to which the measurement corresponds.

Other examples of estimating the received message are described below, with reference to entanglement based examples.

In step 830, the second device generates a first signature based on a parameter. The parameter may for example be a random or pseudo random number generated by the second device, and the signature may be generated using the security credential of the second device. In step 840, the second device sends the first signature and the parameter to the first device over a non-quantum communication channel. Examples of non-quantum communication channels are discussed above with reference to FIG. 7. In step 850, the second device receives from the first device message symbols of the message and a second signature based on the parameter sent to the first device and on the message symbols of the message. The message symbols and signature may be received over the same non-quantum communication channel as was used to send the first signature and parameter.

As discussed above and illustrated at 850*a*, a message symbol of the message comprises at least one of a value of the message and information about how that value was encoded as a qubit. The information about how a value was encoded as a qubit may vary according to the physical realisation of the qubit but may for example comprise at least one of a polarisation basis used with the message value to generate a photon polarisation state, or the coherent state used to encode the message value.

Referring now to FIG. 8*b*, in step 860, the second device verifies the second signature, for example using a shared security credential. If the verification of the second signature is not successful, the second device terminating the method without performing the remaining method steps. If the verification of the second signature is successful, the second device proceeds to compare the estimated message from the received sequence of qubits (obtained at step 820) with the message values from the received message symbols using the information, received in the message symbols, about how the values were encoded as qubits. For example, if the information about how a value was encoded as a qubit comprises a polarisation basis used with the message value to generate a photon polarisation state, then comparing the estimated message from the received sequence of qubits with the received message symbols may comprise comparing the estimated message to the received message values only for those message symbols for which the correct polarisation basis was selected during estimation, as illustrated at 870*a*.

The second device then assesses whether a probability of error between the estimated message and the received message symbols is above a threshold value at step 880. If the probability is above the threshold value, the second device determines at step 885 that a potential intervention by a third party has taken place during the transmission of the encoded message to the second device, and may terminate the method, and, if the message is part of an authentication procedure, may terminate the authentication procedure. If the probability of error between the estimated message and the received message symbols is at or below the threshold value, the second device determines at step 890 that the message has been correctly received.

Implementation of examples of the methods 500, 600, 700 and 800 is illustrated in the message flow diagram of FIG. 9. In FIG. 9, the first device is illustrated as sender 900, and the second device is illustrated as receiver 901. The sender wishes to send a message to the receiver. The sender is in close proximity to the receiver such that photon-based communication is possible. The sender and receiver are provisioned with credentials for exchanging signed messages between them.

Referring to FIG. 9, in S200-9, the sender sends the message to the receiver over the quantum channel, either using single photons with randomly selected polarization as in DV-QKD or as quantum states according to CV-QKD. On receipt, the receiver estimates the values of the message. In the case of single photons, the receiver randomly selects a polarization basis in which to measure the photons. In S300, the receiver generates a random number and signs the random number. In S301, the receiver sends the random number and signature (denoted Signature 1 in FIG. 9) to the sender on a public channel. This may be a radio-based channel, WiFI or other non-quantum communication channel. The sender verifies the signature on the random number to make sure the random number is sent by the receiver. In S302, the sender sends the message symbols (including message values and basis in case of single photons being used or quantum states in case of several photons being sent per message symbol) to the receiver along with a signature (denoted Signature 2 in FIG. 9) calculated on the received random number and the message symbols. The message symbols and the signature are sent on a public channel. In S400-9, the receiver verifies the information received in S302, by verifying the sender signature. Upon successful verification, the receiver verifies that the estimated values of the message from S200-9 match the received values from S302 with sufficiently low error probability. In case of single photons being used, the receiver matches values only for those detected photons for which the randomly chosen basis matches the basis used by the sender.

An attacker seeking to relay the message would have to estimate the message sent in S200. When using single photons, the attacker chooses a polarization at random when measuring the state and then uses this polarization when relaying the message. Similarly, in CV-QKD based setup, the attacker has to guess the quantum state owing to the overlapping states, and then use this state when relaying the message. With increasing sample size, it becomes statistically unlikely to guess correctly, meaning that the intervention by the attacker will become evident when the receiver compares the estimated message with the received message symbols. The use of signatures ensures that the attacker cannot provide message symbols to match the relayed message of step S200. Detection of relay attacks is discussed in further detail below, with reference to FIG. 13.

FIGS. 10*a*, 10*b*, 11*a* and 11*b* are flow charts illustrating another way in which the steps of the methods 500 and 600 may be implemented and supplemented in order to achieve the above discussed and additional functionality. The methods 1000 and 1100, illustrated in FIGS. 10*a*, 10*b*, 11*a* and 11*b*, illustrate implementation of the methods 500 and 600 using entanglement-based qubit realizations similar to those employed in QSDC.

In the methods 1000 and 1100 discussed below, the steps of encoding and delivering the message, and estimating the message, may be performed in a different order to that described above, owing to the different nature of the encoding as qubits. The exchange and verification of first and second signatures still ensures that a sender is not prompted into revealing the message symbols before the receiver has received the encoded message as qubits. However, exploiting the quantum entanglement property in qubit realizations offers different options for ensuring that a message has not been relayed using the methods 500 and 600. For example, in the method 1000 of FIGS. 10*a* and 10*b*, the steps of encoding the message as a sequence of qubits and delivering the encoded message over a quantum communication channel to the second device are achieved through:

a) generating a sequence of entangled qubit pairs, the qubits of the entangled qubit pairs comprising photons,
    b) transmitting one qubit from each pair to the second device and retaining the other qubit from each pair, and
    c) encoding the message onto retained qubits of the entangled photon pairs.

After step c) has been performed, and without the sender transmitting the retained qubits (second qubit of each pair) to the receiver, the message may be estimated by the receiver by measuring the qubits transmitted to it in step b), thus taking advantage of the entangled state of the qubit pairs. The entangled nature of the pairs of photons means that encoding a message value onto one member of a pair will transform the state of the other member of the pair. The message is thus delivered via the entangled pairs. Alternatively, the retained qubits on which the message is encoded may also be transmitted (over a quantum communication channel) to the receiver, allowing the receiver to match up the entangled pairs and perform a Bell measurement on the matched pairs to estimate the message. Error detection may be used to identify interference on the quantum channel used to transmit the qubits in step b) (before encoding of the message), using additional entangled pairs. Additional error detection is then performed using the message itself, by sending the message symbols together with a signature, allowing the receiver to verify the signature and compare the message symbols to the estimated message. The detail of these steps is set out below with reference to FIGS. 10*a*, 10*b*, 11*a* and 11*b*.

FIGS. 10*a* and 10*b* illustrate process steps in a method 1000, performed by a first device, for delivering a message to a second device, wherein the first and second devices are provisioned with security credentials. The message may be an authentication challenge, authentication response, or any other type of message.

Referring first to FIG. 10*a*, in a first step 1012, the first device generates a sequence of entangled qubit pairs, the qubits of the entangled qubit pairs comprising photons. The sequence may comprise N pairs, where M=N+L. The M pairs may be used for encoding of the message and the L pairs may be used for initial error check. The L pairs may be positioned at any location within the sequence of N pairs, and be mixed with the M pairs for message encoding.

In step 1022, the first device transmits one qubit from each of the N pairs to the second device and retains the other qubit from each pair over a quantum channel between the first and second devices. In step 1030, the first device receives from the second device, over a non-quantum channel, a parameter and a specification of:

a) bases used by the second device to measure qubits from the generated sequence that were transmitted to the second device; and b) values measured by the second device for the measured qubits.

The first device also receives a first signature based on the parameter and on the specification. As illustrated at 1030*a*, the specification received from the second device may also include positions of the qubits in the sequence transmitted to the second device that have been measured by the second device. In other examples, a specification of positions may be received separately in a dedicated, integrity protected message. The positions may be the positions of the L qubits for error check.

In step 1040, the first device verifies the first signature, for example using a shared credential. If the verification is unsuccessful, the first device terminates the method at step 1045. If the verification is successful, the first device proceeds in step 1072 to measure retained qubits at the positions in the sequence measured by the second device and using the bases used by the second device, as indicated in the received specification. If the first device has not received a specification of positions of the qubits in the sequence transmitted to the second device that have been measured by the second device, the first device may first determine in step 1070 positions of the qubits in the sequence transmitted to the second device that have been measured by the second device. This determination may be performed on the basis of at least one of the parameter received from the second device and/or a credential shared between the first and second devices. The positions may be determined using a function known to both the first and second devices.

Referring now to FIG. 10*b*, in step 1024, the first device compares the results of the measurement in step 1072 with the measured values received in the specification from the second device. If a probability of error between the results of the measurement and the values received in the specification from the second device is above a threshold value (step 1076), the first device determines that a potential intervention by a third party has taken place, and may terminate the method without performing remaining method steps.

If the probability of error between the results of the measurement and the values received in the specification from the second device is at or below the threshold value, the first device proceeds to encode the message onto the remaining retained qubits of the entangled photon pairs. The remaining retained qubits comprise the retained qubits of the M qubit pairs that were generated for message encoding.

In step 1024, the first device may transmit over a quantum communication channel the retained qubits onto which the message is encoded to the second device, enabling the second device to perform a Bell measurement. Alternatively, the first device may omit this step, and the second device may estimate the message from the qubits transmitted to it in step 1022, relying on the property of quantum entanglement to transfer the encoded message from the retained qubits to the qubits with the second device.

In step 1050, the first device generates a second signature based on the received parameter and message symbols of the message. In step 1060, the first device sends the second signature and message symbols of the message to the second device over the non-quantum channel. As illustrated at 1060*a*, a message symbol of the message comprises at least one of a value of the message and information about how that value was encoded as a qubit. If step 1024 is performed (transmitting the retained qubits over a quantum channel), then the first device may omit the information about how a value was encoded as a qubit from the message symbols, as the second device will estimate the message using a Bell measurement. If step 1024 is not performed, then the first device includes information about how a value was encoded as a qubit in the message symbols to assist the second device in estimating the message. The information about how a value was encoded as a qubit may vary according to the physical realisation of the qubit but may for example comprise at least one of:

a) a polarisation basis used with the message value to generate a photon polarisation state of one of a pair of entangled photons, b) a Bell basis used to encode the message value.

FIGS. 11*a* and 11*b* illustrate a method 1100 for receiving a message from a first device, the method performed by a second device, wherein the first and second devices are provisioned with security credentials. The method 1100 is complementary to the method 1000 described above. As discussed above, the steps of the method 1100 may be performed in a slightly different order to those of the methods 600 and 800 discussed above, owing to the different realization qubits employed in the method 1100. For example, the step of receiving the encoded message over a quantum channel may be divided between the steps of receiving the first of each pair of entangled photons and the step of estimating the message at the second device, once the message has been encoded on the remaining qubits by the first device, without the remaining qubits being transmitted to the second device. In some examples, the receiving step may also comprise receiving at the second device the remaining qubits, if these are transmitted in order to enable the second device to perform a Bell measurement. In addition, the second device may perform measurements for error check before estimating the received message. These steps are discussed in further detail below.

Referring first to FIG. 11*a*, in a first step 1112, the second device receives from the first device one qubit from each of a sequence of entangled qubit pairs generated by the first device, the qubits of the entangled qubit pairs comprising photons. As indicated at 1112, the first device retains the other qubit from each pair of the generated sequence of entangled qubit pairs, in order to encode the message onto the retained qubits after the one qubit from each of the sequence of entangled qubit pairs generated by the first device has been sent to the second device.

The second device then, in step 1192, selects qubits for measurement from the qubits of the generated sequence that were received from the first device. The selected qubits may be the qubits of the L qubits pairs for error check from the sequence of N qubit pairs generated by the first device. The second device may determine positions of qubits for selection on the basis of at least one of a parameter to be sent to the first device (such as a random or pseudo-random number generated by the second device), and/or a credential shared between the first and second devices. The second device may determine the positions using a function known to the first and second devices. For each selected qubit, as illustrated at 1194*a*, the second device then selects a basis in which to measure the qubit and measures the qubit in the selected basis at step 1194. The basis may be selected randomly. In step 1130, the second device generate first signature based on a parameter (such as the random number discussed above) and a specification of the selected bases and values measured in step 1194 for the selected qubits. As illustrated at step 1130*a*, the specification may further include the positions of the qubits in the sequence transmitted to the second device that have been measured by the second device. In other examples, the positions may be sent to the first device is a dedicated message, which may be integrity protected.

In step 1140, the second device sends the specification, parameter and first signature to the first device over a non-quantum channel. The non-quantum, channel may be a radio based channel, WiFi, Bluetooth, etc.

As illustrated at 1114, the second device may in some examples receive from the first device the retained qubits onto which the message is encoded by the first device. In other examples, the first device may omit sending of the retained qubits, and the message, encoded onto the retained qubits, is transferred to the second device only through the entangled states of the qubit pairs generated by the first device.

Referring now to FIG. 11*b*, the second device receives, over a non-quantum channel, message symbols of the message and a second signature based on the parameter sent to the first device and on the symbols of the message. The non-quantum channel may be the same channel as that over which the parameter, specification and first signature were sent. As illustrated at 1150*a*, a message symbol of the message comprises at least one of a value of the message and may comprise information about how that value was encoded as a qubit. If step 1114 is performed (receiving the retained qubits over a quantum channel), then the information about how a value was encoded as a qubit may be omitted from the message symbols, and the second device may estimate the message using a Bell measurement as discussed below. If step 1114 is not performed, then the information about how a value was encoded as a qubit may be included in the message symbols to assist the second device in estimating the message, also as discussed below. The information about how a value was encoded as a qubit may vary according to the physical realisation of the qubit but may for example comprise at least one of:

a) a polarisation basis used with the message value to generate a photon polarisation state of one of a pair of entangled photons, b) a Bell basis used to encode the message value.

In step 1160, the second device verifies the second signature. If the verification is unsuccessful, the second device terminates the method. If the verification is successful, the second device estimates the message from the received sequence of qubits in step 1122. This may comprise, for qubits received from the first device, selecting a basis in which to measure the qubit and measuring the qubit in the selected basis. Selecting a basis in which to measure the qubit may comprises selecting a basis in accordance with the message symbols of the message received from the first device (for example selecting the basis indicated in the information about how a message value was encoded as a qubit).

In other examples in which the retained qubits were received from the first device in step 1114, estimating the message from the received sequence of qubits may comprise reassembling the entangled qubit pairs by matching each received retained qubit onto which a message value is encoded with its corresponding qubit received from the first device, and performing a Bell measurement on the reassembled qubit pairs, as illustrated at 1122*a*. The basis for the measurement may be included in the message symbols received from the first device.

In step 1170, the second device proceeds to compare the estimated message from the received sequence of qubits (obtained at step 1122) with the message values from the received message symbols (received at step 1150) using the information. The second device then assesses whether a probability of error between the estimated message and the received message symbols is above a threshold value at step 1180. If the probability is above the threshold value, the second device determines at step 1185 that a potential intervention by a third party has taken place during the delivery of the encoded message to the second device, and may terminate the method, and, if the message is part of an authentication procedure, may terminate the authentication procedure. If the probability of error between the estimated message and the received message symbols is at or below the threshold value, the second device determines at step 1190 that the message has been correctly received.

Implementation of examples of the methods 500, 600, 1000 and 1100 is illustrated in the message flow diagram of FIG. 12. In FIG. 12, the first device is illustrated as sender 100, and the second device is illustrated as receiver 101. The sender wishes to send a message to the receiver. The sender is in close proximity to the receiver such that light-based communication is possible. The sender and receiver are provisioned with credentials for exchanging signed messages between them.

Referring to FIG. 12, in S200, the sender generates a sequence of N=M+L entangled photon pairs, where M is the size of the message and L is a set of extra photon pairs for error detection. The positions of the L photon pairs are randomly selected in the sequence of N photon pairs. The sender and receiver know the positions of these pairs, either through message exchange or a shared function for determining the positions, as discussed in greater detail below. In S201, the sender sends the first photon from each pair to the receiver.

In S300, the receiver measures the L photon pairs using randomly selected bases. In S301-12, the receiver generates a random number and signs the random number and information about the used bases and the measured values. The receiver then sends the random number, bases used, measured values, and the signature (denoted Signature 1 in FIG. 12) to the sender on a public channel in S302. This may be a radio-based channel. In S303, the sender verifies the signature on the random number, used bases, and measured values to make sure the information comes from the receiver. The sender then measures the selected fraction of photon pairs using the used bases and estimates the error rate based on the received values. If the error rate is below a certain threshold the sender assumes no attacker is interfering with the communication and proceeds to the next step.

In S400-12, the sender encodes the message on the unused second photons of each pair. The sender signs the bases used for encoding the message, the message symbols, and the random number. The sender may then send the retained photons (on which the message is encoded) to the receiver (not shown). The sender then sends the message symbols, and signature (denoted Signature 2 in FIG. 12) to the receiver in S500-12. If the retained photons have not been sent, then the sender also sends the bases used with the message symbols. In S501, the receiver verifies the signature to make sure the information comes from the sender. The receiver decodes the message by measuring on the first photons of each unused pairs using the provided basis. In another example (not shown) the receiver reassembles the photos pairs and performs a Bell measurement to decode the message. The receiver compares the measured result with the received message values from the message symbols in S500-12. If the error rate is below a certain threshold the sender assumes no attacker is interfering with the communication and a relay of the message has not been performed.

The selection of the positions of the L pairs within the N pairs may be done using a pseudo-random function (PRF). Such a PRF may be based on a hash function, for example with a seed selected as the concatenation of the random value generated by the receiver, a fixed string (e.g. "pair selection"), and a shared secret between the sender and receiver. The sender and the receiver may also introduce extra messages for communicating the positions. These messages should be integrity protected such that a man-in-the-middle attack is not possible.

A message flow, based on the message flow of FIG. 9, and in which a receiver 103 detects that a message from a sender 100 has been relayed, is shown in FIG. 13. In this example flow the attacker or attackers use two devices; a first device "Attacker Device 1" 1301 that is close to the sender and a second device "Attacker Device 2" 1302 that is close to the receiver. Referring to FIG. 13, Attacker Device 1 1301 detects light-based communication from the sender in S100-13 and guesses the bases used, or coherent states, in order to measure the communication in S101. Attacker Device 1 1301 then relays the guessed message (including extra information) over a public channel (such as a radio channel) to the Attacker Device 2 in S102. Attacker Device 2 1302 that sends the guessed message using light-based communication towards the receiver in S103. Attacker Devices 1 and 2 are then configured to relay the rest of the communication between the sender and receiver. As the information sent by the receiver 103 in S201 is signed by the receiver, the attacker(s) cannot fool the sender into revealing the sent message symbols until the receiver has measured the sent symbols, which means the attacker(s) cannot delay the relaying of the message in S102 and S103 to the receiver. Similarly, as the information in S203 is signed by the sender, the attacker(s) cannot alter the message in S203 to match the relayed version of message from S103 that the attacker(s) sent to the receiver. On comparing the estimated message with the message symbols received from the sender, the receiver will therefore obtain an error probability that is too high, as the attacker(s) were obliged to guess the bases/ coherent states in S101. The receiver can therefore deduce that a relay attack has taken place.

Figure 14:
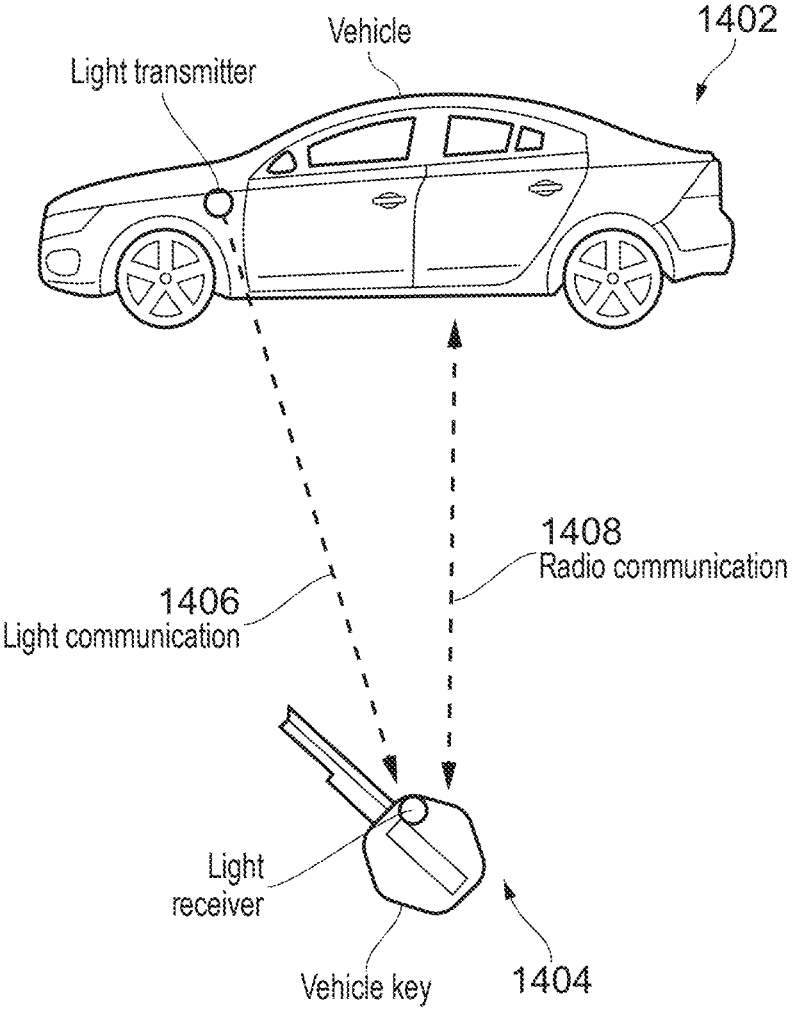

FIG. 14 illustrates a use case for examples of the present disclosure, in which methods according to the present disclosure are used to prevent relay attacks for vehicles using keyless systems. A verifying device (which may be a first device or a second device) is incorporated into a vehicle 1402, and a responding device (which may be a second device or a first device) is incorporated into a vehicle key 1404. Each of the vehicle and key is equipped with a radio transmitter and receiver, and at least one of the vehicle and key is equipped with a light transmitter, with the other of the vehicle and key being equipped with a light receiver. The vehicle and vehicle key are both equipped with credentials enabling authenticated and integrity protected traffic between them. Such credentials may either be asymmetric key pairs or a shared symmetric key. An authentication request or response may be sent between the vehicle and key via light communication 1406 of appropriate wavelength, and the rest of the authentication procedure may be conducted over a radio communication link 1408. The effect is to ensure that the vehicle is unlocked when, and only when, the key is in close range of the car.

Figure 15:
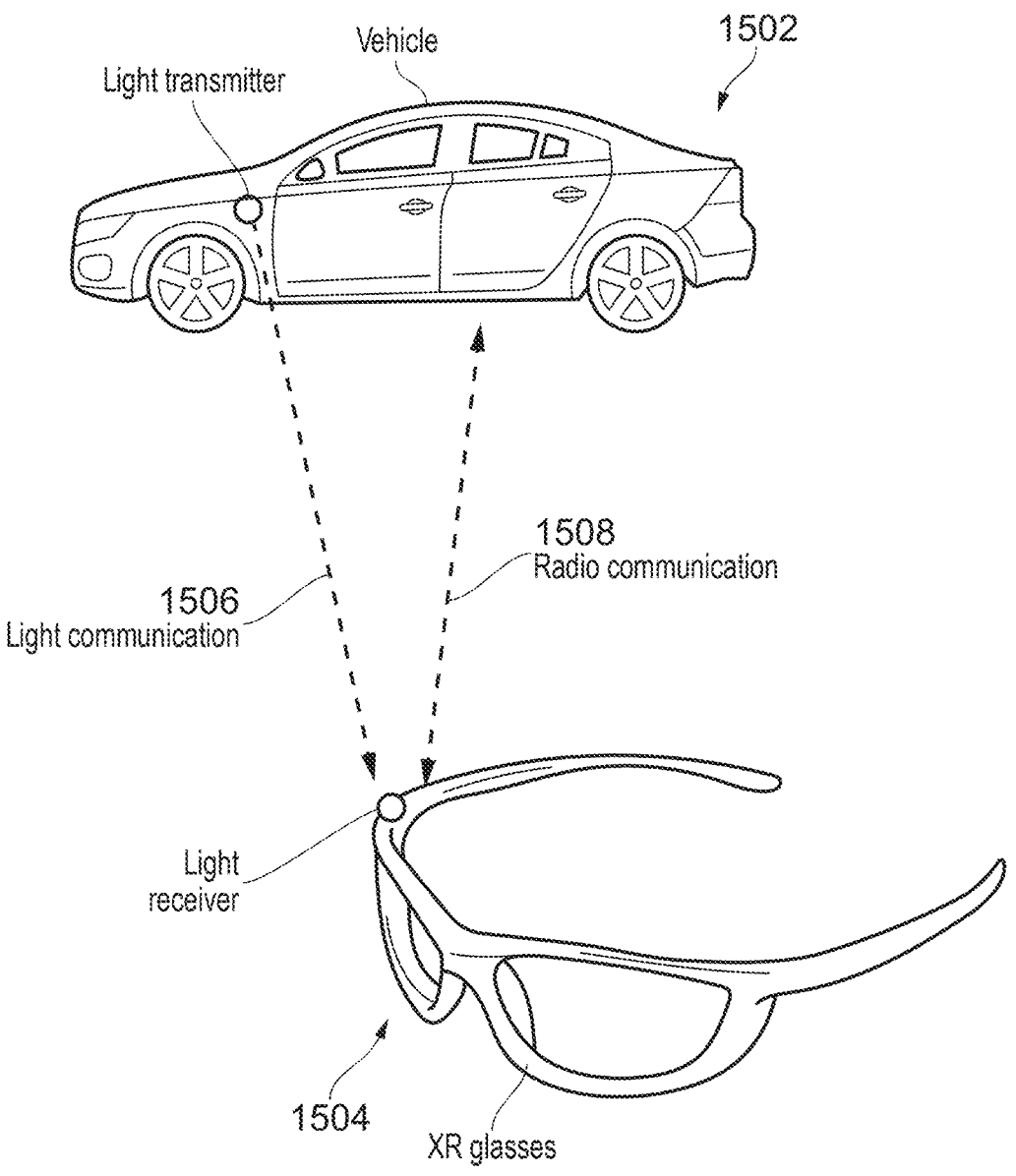

FIG. 15 illustrates a similar use case to that of FIG. 14, in which XR glasses 1504 replace the key 1404 of FIG. 14. The responding device is incorporated into the glasses 1504, and the authentication to unlock the vehicle 1505 proceeds as discussed above with reference to FIG. 14.

Figure 16:
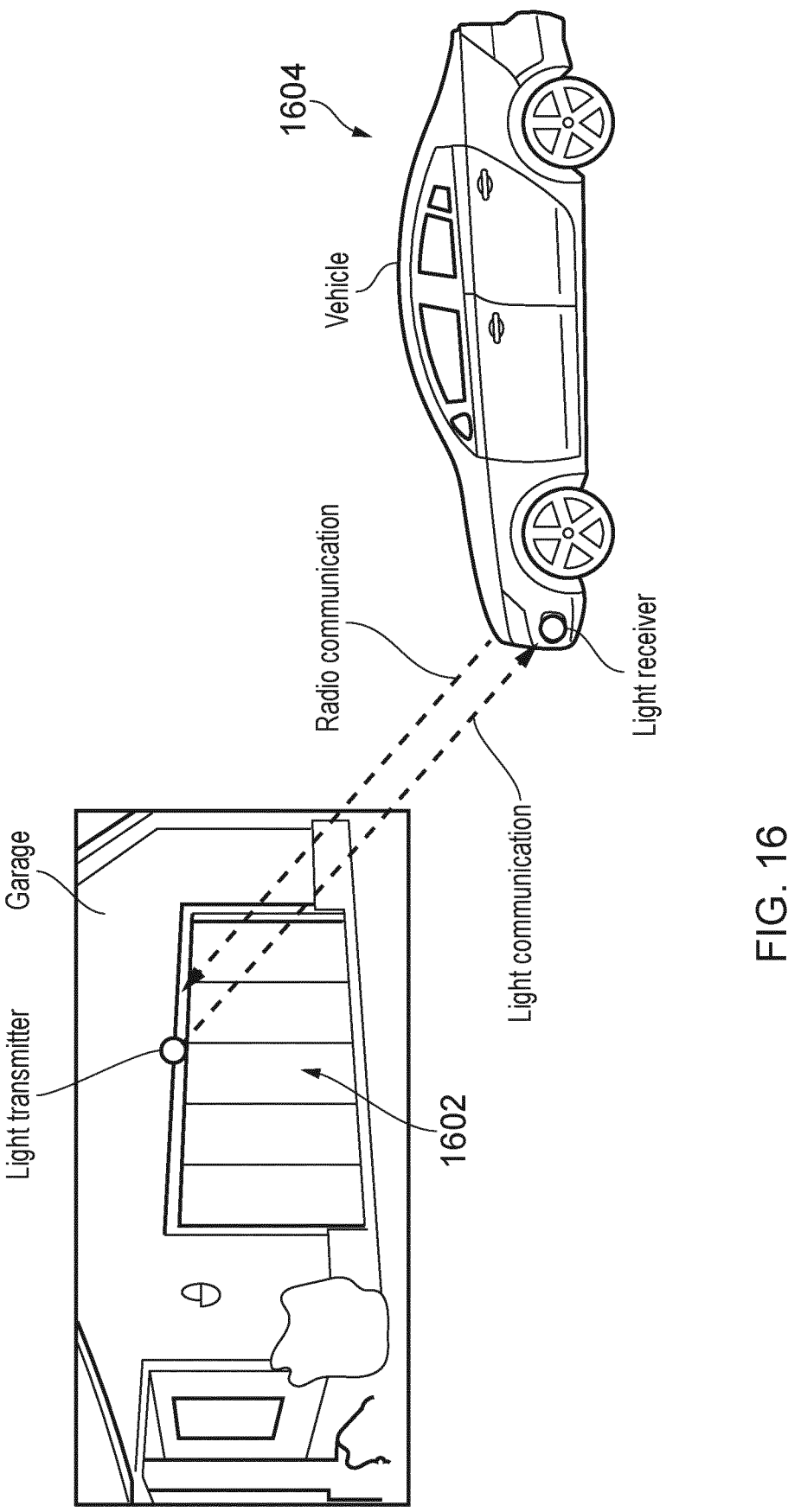
Figure 17:
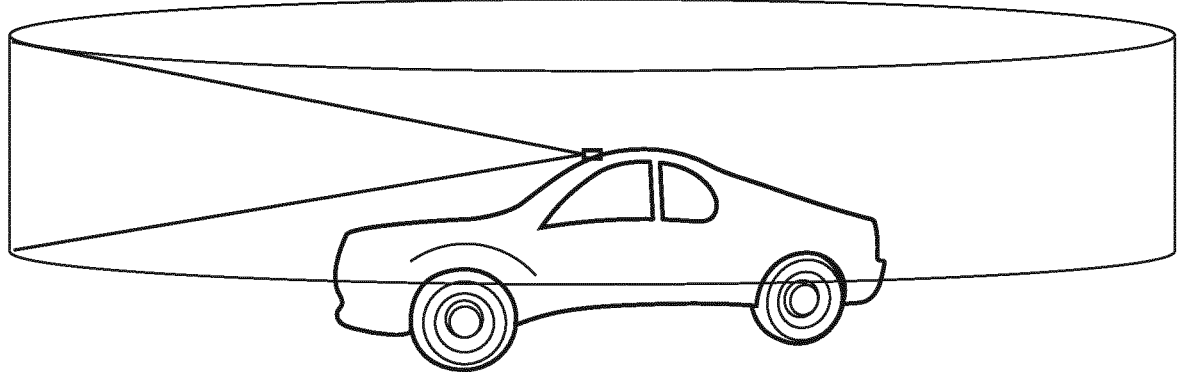

FIG. 16 illustrates another use case for examples of the present disclosure, in which methods according to the present disclosure are used to prevent relay attacks for vehicle accessing a garage. A verifying device (which may be a first device or a second device) is incorporated into a garage door system 1602, and a responding device (which may be a second device or a first device) is incorporated into a vehicle 1604. Each of the door system and vehicle is equipped with a radio transmitter and receiver, and at least one of the door system and vehicle is equipped with a light transmitter, with the other of the door system and vehicle being equipped with a light receiver. The door system and vehicle are both equipped with credentials enabling authenticated and integrity protected traffic between them. Such credentials may either be asymmetric key pairs or a shared symmetric key. An authentication request or response may be sent between the door system and vehicle via light communication of appropriate wavelength, and the rest of the authentication procedure may be conducted over a radio communication link. The effect is to ensure that the garage door is unlocked and opened when, and only when, the vehicle is in close range of the car.

Transmitting and receiving devices, which may be incorporated into or cooperating with verifying and responding devices, are discussed in greater detail below.

An example transmitting device suitable for use in connection with the methods discussed herein comprises a light transmitter having appropriate signal wavelength and signal field of view for the anticipated use case. It also has a receiver and transmitter that could be based on the same technology but could also support another type of communication channel such as RF. This other communication channel is used as the public communication channel.

In some examples, particularly relating to implementations using single photon qubit realisations, it may be desirable to be able to direct the light to the receiving device, and the location of the receiving device may be established by some position tracking technology. Technologies including Bluetooth angle of arrival, introduced in BT5.0, could for example be used. Bluetooth could in such examples also be used as the public communication channel. Once the position of the receiving device is located, the light transmitter may collimate the light beam in that direction to increase the likelihood of the photons hitting the receiver. The collimation of light and directing of light can be achieved in several ways, including for example a laser beam with a rotating mirror.

In the case of continuous variable based implementations of the methods disclosed herein, the single photon used in discrete variable implementations is changed to a distribution of photons. In contrast to CV-QKD, for the methods of the present disclosure, it is not necessary to maintain confidentiality of the message sent using light or photon-based communication. It is therefore possible to illuminate a larger area with the distribution, as shown in the illustration in FIG. 17. As discussed above with reference to FIG. 13, even if an attacker is able to receive the light-based communication, this cannot be accurately relayed to the responding device once measured, and so a relay attack compromising the authentication procedure will not succeed. It will be appreciated that a similar illumination system to that illustrated in FIG. 17 could be used for a building access use case, with a wide light signal being sent in a half circle around the building door or access area.

An example receiving device suitable for use with methods according to the present disclosure comprises a light receiver and a receiver and transmitter for the public communication channel. The light receiver comprises a sensor system to receive incoming photons and a system to change polarization in front of the sensor system.

When considering the practicalities of continuous and discrete variable implementations of the presently described methods, it will be appreciated that continuous variables can achieve significantly higher bit rates than single photons. An additional advantage of continuous variables is that the sender and receiver optics can be made simpler, cheaper and smaller when compared to corresponding single photon components that require mechanical parts.

This simplicity comes with the cost of more expensive post-processing, although this can be achieved on an ordinary CPU.

For applications in which the light-based signal does not need to travel very far and signal strength is high at the receiver, as in a vehicle to key use case and garage to vehicle use case, a normal filter-based receiver solution will be sufficient to filter out background interference from the message signal, although this solution will limit the range from the transmitter to the receiver. It will be appreciated that the filter referred to here is a frequency Band Pass Filter (BPF), which will let a range of light wavelengths through, and not the polarization filter that allows all frequencies to pass but aligns the polarization of the waves.

In applications in which the signal strength is low continuous variable based implementations may be employed with an optical homodyne detector or optical heterodyne detector, as these technologies allow extremely narrow band frequency detection, far superior to any colour filters available. This is useful to be able to filter out any background light and widely used for example in LIDAR systems in which a lot of background light is present and can disturb the signal.

Homodyne and heterodyne receivers are so called coherent detection receivers, and they add light to the received signal as a part of the detection process to be able to read very low signal input. In homodyne detection, the signal is demodulated directly in the baseband. The detector requires a local oscillator whose frequency and phase match the carrier signal. Information can be transmitted through amplitude, phase or frequency modulation. In a heterodyne detection system, there is no need for the frequency or the phase of the local oscillator to match the signal. Information can again be transmitted through amplitude, phase or frequency modulation.

FIG. 18 illustrates an example system with a heterodyne detector. The laser 1802 represents the incoming light signal, for example from a car transmitting an authentication request to a key over a quantum channel. Inside the key, the laser signal is picked up and light from the local optical oscillator 1804 is added. The combined photo-detected signal passes through a Band Pass Filter 1806 and then in parallel into a delay 1808 and a carrier recovery 1810. The signals are added 1812 and then finally passed through a Low Pass Filter 1814. The signal is then transferred to the baseband.

The above discussion of FIGS. 1 to 11b illustrates different ways in which the methods for message exchange and authentication disclosed herein may be implemented. As discussed above, the methods 100 and 200 are performed by a verifying device and a responding device respectively, the methods 500, 700 and 1000 are performed by a first device (which may be a verifying device or a responding device) and the methods 600, 800 and 1100 are performed by a second device (which may also be a verifying device or a responding device). The present disclosure provides a verifying device, responding device, first device and second device which are adapted to perform any or all of the steps of the above discussed methods.

FIG. 19 is a block diagram illustrating a verifying device 1900 which may implement the method 100, 500, 600, 700, 800, 1000 and/or 1100 according to examples of the present disclosure, for example on receipt of suitable instructions from a computer program 1950. Referring to FIG. 19, the verifying device 1900 comprises processing circuitry 1910. The processing circuitry may comprise a processor 1902, a memory 1904 and interfaces 1906. The processing circuitry 1910 is operable to perform some or all of the steps of the method 100, 500, 600, 700, 800, 1000 and/or 1100 as discussed above with reference to FIGS. 1, 5, 6, 7, 8a, 8b, 10a, 10b, 11a and 11b. Referring particularly to the method 100 of FIG. 1, the processor 1902 may be configured to generate an authentication challenge and to verify the subsequent authentication response. The interfaces 1906 may be configured to deliver the authentication challenge to the responding device and to receive an authentication response from the responding device, wherein at least one of the authentication challenge or authentication response is encoded as a sequence of qubits and delivered over a quantum communication channel between the verifying device and the responding device. The memory 1904 may contain instructions executable by the rest of the processing circuitry 1910 such that the verifying device 1900 is operable to perform some or all of the steps of the method 100, 500, 600, 700, 800, 1000 and/or 1100, including for example generating, by the processor, the authentication challenge and verifying, by the processor, the subsequent authentication response. The instructions may also include instructions for executing one or more telecommunications and/or data communications protocols such as may be implemented by the interfaces 1906 in delivering the authentication challenge and receiving the authentication response. The instructions may be stored in the form of the computer program 1950.

FIG. 20 is a block diagram illustrating a responding device 1900 which may implement the method 200, 500, 600, 700, 800, 1000 and/or 1100 according to examples of the present disclosure, for example on receipt of suitable instructions from a computer program 2050. Referring to FIG. 20, the responding device 2000 comprises processing circuitry 2010. The processing circuitry may comprise a processor 2002, a memory 2004 and interfaces 2006. The processing circuitry 2010 is operable to perform some or all of the steps of the method 200, 500, 600, 700, 800, 1000 and/or 1100 as discussed above with reference to FIGS. 2, 5, 6, 7, 8a, 8b, 10a, 10b, 11a and 11b. Referring particularly to the method 200 of FIG. 2, the interfaces 2006 may be configured to receive an authentication challenge from the verifying device and to deliver an authentication response to the verifying device, wherein at least one of the authentication challenge or authentication response is encoded as a sequence of qubits and delivered over a quantum communication channel between the verifying device and the responding device. The processor 2002 may be configured to generate the authentication response based on the authentication challenge. The memory 2004 may contain instructions executable by the rest of the processing circuitry 2010 such that the responding device 2000 is operable to perform some or all of the steps of the method 200, 500, 600, 700, 800, 1000 and/or 1100, including for example generating, by the processor 2002, the authentication response based on the authentication challenge. The instructions may also include instructions for executing one or more telecommunications and/or data communications protocols such as may be implemented by the interfaces 2006 in receiving the authentication challenge and delivering the authentication response. The instructions may be stored in the form of the computer program 2050.

FIG. 21 is a block diagram illustrating a first device 2100 which may implement the method 100, 200, 500, 700, and/or 1000 according to examples of the present disclosure, for example on receipt of suitable instructions from a computer program 2150. Referring to FIG. 21, the first device 2100 comprises processing circuitry 2110. The processing circuitry may comprise a processor 2102, a memory 2104 and interfaces 2106. The processing circuitry 2110 is operable to perform some or all of the steps of the method 100, 200, 500, 700, and/or 1000 as discussed above with reference to FIGS. 1, 2, 5, 7, 10a and 10b. Referring particularly to the method 500 of FIG. 5, the processor 2102 may be configured to encode a message as a sequence of qubits, verify a first signature, and, if the verification of the first signature is successful, generate a second signature based on the received parameter and on message symbols of the message. The interfaces 2106 may be configured to deliver the encoded message over a quantum communication channel to the second device, receive a parameter and a first signature, which is based on the parameter, from the second device, and, if the verification by the processor 2102 of the first signature is successful, send the message symbols and the second signature to the second device. The memory 2104 may contain instructions executable by the rest of the processing circuitry 2110 such that the first device 2100 is operable to perform some or all of the steps of the method 100, 200, 500, 700, and/or 1000, including for example encoding, by the processor 2102 a message as a sequence of qubits, verifying a first signature, and, if the verification of the first signature is successful, generate a second signature based on the received parameter and on message symbols of the message. The instructions may also include instructions for executing one or more telecommunications and/or data communications protocols such as may be implemented by the interfaces 2106 in delivering the encoded message to the second device, receiving a parameter and a first signature from the second device, and sending the message symbols and the second signature to the second device. The instructions may be stored in the form of the computer program 2150.

FIG. 22 is a block diagram illustrating a second device 2200 which may implement the method 100, 200, 600, 800, and/or 1100 according to examples of the present disclosure, for example on receipt of suitable instructions from a computer program 2050. Referring to FIG. 22, the second device 2200 comprises processing circuitry 2210. The processing circuitry may comprise a processor 2202, a memory 2204 and interfaces 2206. The processing circuitry 2210 is operable to perform some or all of the steps of the method 100, 200, 600, 800, and/or 1100 as discussed above with reference to FIGS. 1, 2, 6, 8a, 8b, 11a and 11b. Referring particularly to the method 600 of FIG. 6, the interfaces 2206 may be configured to receive an encoded message from the first device, wherein the encoded message comprises a sequence of qubits and is received over a quantum communication channel to the first device, to send a first signature and a parameter to the first device, and to receive from the first device, message symbols of the message and a second signature based on the parameter sent to the first device and on the message symbols of the message. The processor 2202 may be configured to estimate the encoded message from the received sequence of qubits, generate the first signature based on a parameter, verify the second signature received from the first device, and, if the verification of the second signature is successful, compare the estimated message from the received sequence of qubits with the received message symbols. The processor 2202 may be further configured to, if a probability of error between the estimated message and the received message symbols is below a threshold value, determine that the message has been correctly received. The memory 2204 may contain instructions executable by the rest of the processing circuitry 2210 such that the second device 2200 is operable to perform some or all of the steps of the method 100, 200, 600, 800, and/or 1100, including for example estimating, by the processor 2202, the encoded message from the received sequence of qubits, generating the first signature based on a parameter, verifying the second signature received from the first device, and, if the verification of the second signature is successful, comparing the estimated message from the received sequence of qubits with the received message symbols and, if a probability of error between the estimated message and the received message symbols is below a threshold value, determining that the message has been correctly received. The instructions may also include instructions for executing one or more telecommunications and/or data communications protocols such as may be implemented by the interfaces 2206 in receiving an encoded message from the first device, wherein the encoded message comprises a sequence of qubits and is received over a quantum communication channel to the first device, sending a first signature and a parameter to the first device, and receiving from the first device, message symbols of the message and a second signature based on the parameter sent to the first device and on the message symbols of the message. The instructions may be stored in the form of the computer program 2250.

In some examples, the processor 1902, 2002, 2102, 2202 described above may include one or more microprocessors or microcontrollers, as well as other digital hardware, which may include digital signal processors (DSPs), special-purpose digital logic, etc. The processor 1902, 2002, 2102, 2202 may be implemented by any type of integrated circuit, such as an Application Specific Integrated Circuit (ASIC), Field Programmable Gate Array (FPGA) etc. The memory 1904, 2004, 2104, 2204 may include one or several types of memory suitable for the processor, such as read-only memory (ROM), random-access memory, cache memory, flash memory devices, optical storage devices, solid state disk, hard disk drive etc.

Another example of verifying device may comprise a plurality of functional modules, which may execute examples of the method 100, 500, 600, 700, 800, 1000 and/or 1100 according to examples of the present disclosure, for example according to computer readable instructions received from a computer program. It will be understood that the modules may be functional modules, and may be realised in any appropriate combination of hardware and/or software. The modules may comprise one or more processors and may be integrated to any degree. Such an example verifying device may comprise a generating module for generating an authentication challenge, a delivery module for delivering the authentication challenge to a responding device, a receiving module an authentication response from the responding device, and a verification module for verifying the authentication response, wherein at least one of the authentication challenge or authentication response is encoded as a sequence of qubits and delivered over a quantum communication channel between the verifying device and the responding device.

Another example of responding device may comprise a plurality of functional modules, which may execute examples of the method 200, 500, 600, 700, 800, 1000 and/or 1100 according to examples of the present disclosure, for example according to computer readable instructions received from a computer program. It will be understood that the modules may be functional modules, and may be realised in any appropriate combination of hardware and/or software. The modules may comprise one or more processors and may be integrated to any degree. Such an example responding device may comprise a receiving module for receiving an authentication challenge from the verifying device, a generating module for generating an authentication response based on the authentication challenge, and a delivery module for delivering the authentication response to the verifying device, wherein at least one of the authentication challenge or authentication response is encoded as a sequence of qubits and delivered over a quantum communication channel between the verifying device and the responding device.

Another example of first device may comprise a plurality of functional modules, which may execute examples of the method 100, 200, 500, 700, and/or 1000 according to examples of the present disclosure, for example according to computer readable instructions received from a computer program. It will be understood that the modules may be functional modules, and may be realised in any appropriate combination of hardware and/or software. The modules may comprise one or more processors and may be integrated to any degree. Such an example first device may comprise an encoding module for encoding a message as a sequence of qubits, a delivery module for delivering the encoded message over a quantum communication channel to the second device, a receiving module for receiving a parameter and a first signature, which is based on the parameter, from the second device, a verification module for verifying the first signature, and a generating module for, if the verification of the first signature is successful, generating a second signature based on the received parameter and on message symbols of the message. The delivery module may also be for sending the message symbols and the second signature to the second device.

Another example of second device may comprise a plurality of functional modules, which may execute examples of the method 100, 200, 600, 800, and/or 1100 according to examples of the present disclosure, for example according to computer readable instructions received from a computer program. It will be understood that the modules may be functional modules, and may be realised in any appropriate combination of hardware and/or software. The modules may comprise one or more processors and may be integrated to any degree. Such an example second device may comprise a receiving module for receiving an encoded message from the first device, wherein the encoded message comprises a sequence of qubits and is received over a quantum communication channel to the first device, and an estimating module for estimating the message from the received sequence of qubits. The example second device may further comprise a generating module for generating a first signature based on a parameter and a sending module for send the first signature and the parameter to the first device. The receiving module may also be for receiving from the first device, message symbols of the message and a second signature based on the parameter sent to the first device and on the message symbols of the message. The example second device may further comprise a verifying module for verifying the second signature and a comparing module for, if the verification of the second signature is successful, comparing the estimated message from the received sequence of qubits with the received message symbols. The example second device may further comprise a determining module for, if a probability of error between the estimated message and the received message symbols is below a threshold value, determining that the message has been correctly received.

It will be appreciated that examples of the present disclosure may be virtualised, such that the nodes described herein may be instantiated across one or more virtual nodes in a cloud environment, and the methods and processes described herein may be run in a cloud environment.

Aspects of the present disclosure thus provide authentication methods, and methods for delivering and receiving a message, in which a relay attack may be detected. The methods make use of a quantum communication channel for delivery of the message, which may be an authentication challenge or response. The quantum communication channel supports photon-based communication, and may for example comprise free space. The methods of the present disclosure exploit at least one of the quantum properties of light to ensure that the interference of any attacker seeking to relay the message will be evident to at least one of the sending or receiving party, allowing the parties to take appropriate action, discarding the message, resending the message, terminating the authentication procedure, refusing authentication, etc.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality and a single processor or other unit may fulfil the functions of several units recited in the claims. Any reference signs in the claims shall not be construed so as to limit their scope.

The invention claimed is:

1. A method for performing an authentication procedure between a verifying device located at a certain location and a responding device, wherein the verifying and responding devices are provisioned with security credentials, the method, performed by the verifying device, comprising:
   generating an authentication challenge;
   delivering the authentication challenge to the responding device, wherein delivering the authentication challenge to the responding device comprises:
      receiving a parameter and a first signature, which is based on the parameter, from the responding device;
      verifying the first signature; and
      based on determining that the verification of the first signature is successful:
         generating a second signature based on the received parameter and on message symbols of the authentication challenge; and
         sending the authentication challenge message symbols and the second signature to the responding device;
   receiving an authentication response from the responding device; and
   verifying the authentication response, wherein
   the authentication challenge is encoded as a sequence of qubits and delivered over a quantum communication channel between the verifying device and the responding device, and
   the encoding of the authentication challenge as the sequence of qubits comprises:
      encoding the authentication challenge as a sequence of photon polarisation states or coherent states of light, or
      encoding the authentication challenge as a sequence of entangled states of photon pairs.

2. The method of claim 1, wherein
the authentication response is delivered over a non-quantum communication channel between the verifying device and the responding device.

3. The method of claim 1, further comprising:
verifying that a probability that the authentication challenge that is encoded as the sequence of qubits and delivered over the quantum communication channel between the verifying device and the responding device has been relayed by a third party is below a threshold value.

4. The method of claim 1, wherein the receiving of the parameter and the first signature from the responding device comprises receiving the parameter and the first signature over a non-quantum communication channel.

5. The method of claim 1, wherein the sending of the authentication challenge message symbols and the second signature to the responding device comprises sending the authentication challenge message symbols and the second signature over a non-quantum communication channel.

6. The method of claim 1, wherein the method comprises:
determining a probability of relay of the at least one of the authentication challenge or the authentication response.

7. The method of claim 1, wherein the method comprises:
encoding the authentication challenge as the sequence of entangled states of photon pairs.

8. A method for performing an authentication procedure between a verifying device located at a certain location and a responding device, wherein the verifying and responding devices are provisioned with security credentials, the method, performed by the responding device, comprising:
   receiving an authentication challenge from the verifying device;
   generating an authentication response based on the authentication challenge;
   encoding the authentication response as a sequence of qubits; and
   delivering the encoded authentication response to the verifying device, wherein
   the encoded authentication response is delivered over a quantum communication channel between the verifying device and the responding device,
   encoding the authentication response as the sequence of qubits comprises:
      encoding the authentication response as a sequence of photon polarisation states or coherent states of light,
   delivering the encoded authentication response over the quantum communication channel to the verifying device comprises transmitting the qubits on which the authentication response is encoded to the verifying device, and
   the method further comprises:
      receiving a parameter and a first signature, which is based on the parameter, from the verifying device;
      verifying the first signature; and
      if the verification of the first signature is successful:
         generating a second signature based on the received parameter and on message symbols of the authentication response; and
         sending the authentication response message symbols and the second signature to the verifying device.

9. The method of claim 8, wherein
the authentication challenge is delivered over a non-quantum communication channel between the verifying device and the responding device.

10. The method of claim 8, wherein the sequence of qubits comprises a sequence of quantum states of one or more photons.

11. The method of claim 8, further comprising:
verifying that a probability that the authentication response that is encoded as the sequence of qubits and delivered over the quantum communication channel between the verifying device and the responding device has been relayed by a third party is below a threshold value.

12. The method of claim 8, wherein
the method comprises:
receiving a parameter and a first signature, which is based on the parameter, from the verifying device;
verifying the first signature; and
if the verification of the first signature is successful:
generating a second signature based on the received parameter and on message symbols of the authentication response; and
sending the authentication response message symbols and the second signature to the verifying device.

13. The method of claim 12, wherein the receiving of the parameter and the first signature from the verifying device comprises receiving the parameter and the first signature over a non-quantum communication channel.

14. The method of claim 12, wherein the sending of the authentication response message symbols and the second signature to the verifying device comprises sending the authentication response message symbols and the second signature over a non-quantum communication channel.

15. The method of claim 12, wherein a message symbol of the authentication response comprises at least one of:
a value of the authentication response; and
information about how the value of the authentication response was encoded as a qubit.

16. The method of claim 15, wherein the information about how the value was encoded as a qubit comprises at least one of:
a polarisation basis used with the authentication response value to generate a photon polarisation state;
a polarisation basis used with the authentication response value to generate a photon polarisation state of one of a pair of entangled photons;
a Bell basis used to encode the authentication response value; or
the coherent state used to encode the authentication response value.

17. The method of claim 12, wherein the encoding of the authentication response as the sequence of qubits comprises encoding the authentication response as a sequence of entangled states of photon pairs; and wherein encoding the authentication response as the sequence of qubits and delivering the encoded authentication response over the quantum communication channel to the verifying device comprises:
generating a sequence of entangled qubit pairs, the qubits of the entangled qubit pairs comprising photons;
transmitting one qubit from each pair to the verifying device and retaining the other qubit from each pair; and
encoding the authentication response onto retained qubits of the entangled photon pairs.

18. The method of claim 17, wherein the encoding of the authentication response as the sequence of qubits and delivering the encoded authentication response over the quantum communication channel to the verifying device further comprises:
transmitting the retained qubits onto which the authentication response is encoded to the verifying device.

19. The method of claim 8, wherein the method comprises:
determining a probability of relay of the at least one of the authentication challenge or the authentication response.

20. A method, performed by a first device located at a certain location, for delivering a message to a second device, wherein the first and second devices are provisioned with security credentials, the method comprising:
encoding the message as a sequence of qubits;
delivering the encoded message over a quantum communication channel to the second device;
receiving a parameter and a first signature, which is based on the parameter, from the second device;
verifying the first signature; and
based on determining that the verification of the first signature is successful:
generating a second signature based on the received parameter and on message symbols of the message; and
sending the message symbols and the second signature to the second device.

21. The method of claim 20, wherein the receiving of the parameter and the first signature from the second device comprises receiving the parameter and the first signature over a non-quantum communication channel.

22. The method of claim 20, wherein the sending of the message symbols and the second signature to the second device comprises sending the message symbols and the second signature over a non-quantum communication channel.

23. The method of claim 20, wherein a message symbol of the message comprises at least one of:
value of the message; and
information about how the value of the message was encoded as a qubit.

24. The method of claim 20, wherein the encoding of the message as the sequence of qubits comprises encoding the message as a sequence of quantum states of one or more photons.

25. The method of claim 20, further comprising:
detecting a position of the second device, wherein
the delivering of the encoded message over the quantum communication channel to the second device comprises directing the delivery of the encoded message towards the detected position of the second device.

26. A method for receiving a first message from a first device located at a certain location, wherein the method is performed by a second device, and wherein the first and second devices are provisioned with security credentials, the method comprising:
receiving an encoded message from the first device, wherein the encoded message comprises a sequence of qubits and is received over a quantum communication channel to the first device;
estimating the first message from the received sequence of qubits;
generating a first signature based on a parameter;
sending the first signature and the parameter to the first device;
receiving from the first device, message symbols of the first message and a second signature based on the parameter sent to the first device and on the message symbols of the first message;
verifying the second signature; and
based on determining that the verification of the second signature is successful:
comparing the estimated message from the received sequence of qubits with the received message symbols; and
based on determining that a probability of error between the estimated message and the received message symbols is below a threshold value, determining that the first message has been correctly received.

27. The method of claim 26, further comprising:
based on determining that the probability of the error between the estimated message and the received message symbols is above a threshold value, determining that a potential intervention by a third party has taken place during the delivery of the encoded message to the second device.

28. The method of claim 26, wherein sending the first signature and the parameter to the first device comprises sending the first signature and the parameter over a non-quantum communication channel.

29. The method of claim 26, wherein the receiving of the message symbols of the first message and the second signature from the first device comprises receiving the message symbols and the second signature over a non-quantum communication channel.

30. A verifying device comprising processing circuitry configured to cause the verifying device to perform a method for performing an authentication procedure between the verifying device located at a certain location and a responding device, wherein the verifying and responding devices are provisioned with security credentials, the method comprising:

generating an authentication challenge;

delivering the authentication challenge to the responding device, wherein delivering the authentication challenge to the responding device comprises:

receiving a parameter and a first signature, which is based on the parameter, from the responding device;

verifying the first signature; and based on determining that the verification of the first signature is successful:

generating a second signature based on the received parameter and on message symbols of the authentication challenge; and sending the authentication challenge message symbols and the second signature to the responding device;

receiving an authentication response from the responding device; and verifying the authentication response, wherein the authentication challenge is encoded as a sequence of qubits and delivered over a quantum communication channel between the verifying device and the responding device, and the encoding of the authentication challenge as the sequence of qubits comprises:

encoding the authentication challenge as a sequence of photon polarisation states or coherent states of light, or encoding the authentication challenge as a sequence of entangled states of photon pairs.

31. A responding device for performing an authentication procedure between a verifying device and the responding device, wherein the verifying device is located at a certain location, and further wherein the verifying and responding devices are provisioned with security credentials, the responding device comprising processing circuitry configured to cause the responding device to perform a method comprising:

receiving an authentication challenge from the verifying device;

generating an authentication response based on the authentication challenge;

encoding the authentication response as a sequence of qubits; and delivering the encoded authentication response to the verifying device, wherein the encoded authentication response is delivered over a quantum communication channel between the verifying device and the responding device, encoding the authentication response as the sequence of qubits comprises encoding the authentication response as a sequence of photon polarisation states or coherent states of light, delivering the encoded authentication response over the quantum communication channel to the verifying device comprises transmitting the qubits on which the authentication response is encoded to the verifying device, and the method further comprises:

receiving a parameter and a first signature, which is based on the parameter, from the verifying device;

verifying the first signature; and if the verification of the first signature is successful:

generating a second signature based on the received parameter and on message symbols of the authentication response; and sending the authentication response message symbols and the second signature to the verifying device.

\* \* \* \* \*